(12) United States Patent
Munkvold et al.

(10) Patent No.: US 7,890,921 B2
(45) Date of Patent: Feb. 15, 2011

(54) AUTOMATED METHOD FOR COHERENT PROJECT MANAGEMENT

(75) Inventors: Calvin D. Munkvold, Eden Prairie, MN (US); Callistus C. Schissel, Brooklyn Park, MN (US); Cliffton M. Kornelis, Waconia, MN (US)

(73) Assignee: Lifecylce Technologies, Inc., Eden Prairie, MN (US)

( * ) Notice: Subject to any disclaimer, the term of this patent is extended or adjusted under 35 U.S.C. 154(b) by 1232 days.

(21) Appl. No.: 11/496,164

(22) Filed: Jul. 31, 2006

(65) Prior Publication Data

US 2008/0126945 A1     May 29, 2008

(51) Int. Cl.
*G06F 9/44* (2006.01)

(52) U.S. Cl. .................. 717/101; 717/104; 717/107; 717/121

(58) Field of Classification Search .................. None
See application file for complete search history.

(56) References Cited

U.S. PATENT DOCUMENTS

| | | | |
|---|---|---|---|
| 5,530,861 A | 6/1996 | Diamant | |
| 5,907,490 A | 5/1999 | Oliver | |
| 6,016,394 A | 1/2000 | Walker | |
| 6,036,345 A | 3/2000 | Jannette | |
| 6,076,105 A | 6/2000 | Wolff | |
| 6,944,622 B1 | 9/2005 | Mitchell | |
| 6,970,842 B1 | 11/2005 | Ashby | |
| 6,988,128 B1 | 1/2006 | Alexander | |

OTHER PUBLICATIONS

Mindjet Corporation, "Enhance your Microsoft Office Productivity with Mindjet MindManager," 2006.
Dexter+Cheney,"Project Management," www.dexterchaney.com, undated.
Ferraiolo,"Role-Based Access Control (RBAC): Features and Motivations," undated, National Institute of Standards and Technology, US Dept. of Commerce.

*Primary Examiner*—Chuck O Kendall
(74) *Attorney, Agent, or Firm*—Citadel Patent Law; George A. Leone

(57) ABSTRACT

A coherent interactive project management system has a dashboard including a graphic user interface ("GUI") in communication with a GUI engine, where the dashboard provides links to a plurality of differing interactive hierarchical display screens. A data engine is connected to transmit information to and receive information from the dashboard. Each user has access to a user-specific version of the dashboard, where the user-specific version controls displays of and access to information to information applying to each specific user, and the specific user employs the user-specific version of the dashboard for requesting, modifying and sharing information through the data engine. The GUI engine includes a module for dynamically generating customized enterable forms used for interactively adding or modifying data available through the data engine.

27 Claims, 14 Drawing Sheets

LIFECYCLE 412 414 integrate your world COHERE

Welcome: Cliff Kornelis 06/08/2006
Back | Help | About | Logout

My Dashboard
- My Dashboard
- Home
- Edit Account
- Products
  - Cohere
    - Release1-2005
    - Release x Future
    - Release2 2005
    - Release3 2005
      - Assignments
      - Milestones
      - Requirements
      - Test
      - Defects
      - Reports
      - Config. Mgmt
      - Issues
      - Setup
    - Release 4 2006
    - Release 5 2006
      - Assignments
      - Milestones
      - Requirements
      - Test
      - Defects
      - Reports
      - Config. Mgmt
      - Issues
      - Setup

404

My Dashboard
Administration

Project | Edit | Reschedule

Cohere / Release 5 2006  422  —212  214

Start Date: 06/01/2006    End Date: 08/02/2005    Active: Yes    Starting On Time    Overall Health
                                                                  None Started       At Risk
                                                                      430              432
Manager(s):                Description:
                           Next release of Cohere.

PROJECT AREAS

| AREA | DESCRIPTION | STATUS |
|---|---|---|
| Requirements | 420 Current percent of target completion: 90% | |
| Test | 220 Percentage of testcases currently passing: 0% | 402 |
| Defects | Percentage of defects completed: 0% | |

MY REQUIREMENTS   (New)(Edit)(Update)(Reassign)(Attach)

| ↕ | NAME↕ | CATEGORY↕ 426 | START DATE↕ | FINISH DATE↕ | % COMPLETE↕ |
|---|---|---|---|---|---|
| □ | 19.22 | Object Indexing Service | 06/05/2006 | 06/16/2006 | 50 ● |
| □ | 19.23 | Service Architecture | 05/18/2006 | 05/19/2006 | 80 ● |
| □ | 19.25 | Factory/Loader for object types | 06/01/2006 | 06/09/2006 | 80 ● |
| □ | 19.26 | Implementation New DataEngine | 06/01/2006 | 06/23/2006 | (12) ● |
| □ | 19.26.1 | Event architecture | 07/12/2006 | 07/14/2006 | 25 ● |
| □ | 19.26.4 | Bootstrap/Loader | 07/10/2006 | 07/21/2006 | 0 |
| □ | 20.1 | Resource Budget | 06/26/2006 | 07/14/2006 | (0) |
| □ | 20.1.5 | Resource Usage | | | 0 |

447  221

MY TESTCASES   (New)(Edit)(Result)(Reassign)(Link)(Delete)

| ↕ | NAME↕ | DATE EDITED↕ | CATEGORY↕ | PRIORITY↕ | STATUS↕ |
|---|---|---|---|---|---|

No Entries Found.  441

MY DEFECTS   (New)(Edit)(Update)(Reassign)(Export)(Delete)

| ↕ | NAME | DATE SUBMITTED↕ | PRIORITY↕ 443 | STATUS↕ |
|---|---|---|---|---|

No Entries Found.

ISSUES   (New)(Edit)(Update)(Reassign)(Delete)

| ↕ | NAME | ASSIGNEE↕ 428 | TYPE↕ | PRIORITY↕ | START DATE↕ | FINISH DATE↕ | STATUS↕ |
|---|---|---|---|---|---|---|---|

No Entries Found.

MY ASSIGNMENTS

| ↕ | NAME↕ | | | | | | % COMPLETE↕ |
|---|---|---|---|---|---|---|---|
| □ | NoName 445 | | | | 11/28/2005 | 11/29/2005 | 0 |

FIG. 8

LIFECYCLE
integrate your world COHERE

Welcome: Cliff Kornelis 06/08/2006
Back | Help | About | Logout

Home

PRODUCTS

| NAME⇵ | DESCRIPTION | 240 242 246 STATUS |
|---|---|---|
| Data Import | Product Created for Import | ● |
| Cohere | Initial Release of the Cohere also known as TIS. | ◐ |
| Impl | Implementation of ▓▓▓▓ requirements. | ◯ |

250

222

MY ASSIGNMENTS

258

MY REQUIREMENTS ( New ) ( Edit ) ( Update ) ( Reassign ) ( Attach )

| PAGE: | NAME⇵ | PROJECT⇵ | STATUS |
|---|---|---|---|
| page 1 | ☐ Graphical display | Release 4 2006 | ● |
| page 2 | ☐ Resources | Release 4 2006 | ◐ |
| page 3 | ☐ Content for Cohere | Release 4 2006 | ◯ |
| page 4 | ☐ Content for Lakes | Release 4 2006 | |
| | ☐ Resource Usage | Release 5 2006 | |
| | ☐ Bootstrap/Loader | Release 5 2006 | ● |
| | ☐ Object Indexing Service | Release 5 2006 | ● |
| | ☐ Service Architecture | Release 5 2006 | ◯ |
| | ☐ Factory/Loader for object types | Release 5 2006 | ● |
| | ☐ Event architecture | Release 5 2006 | ● |

224
226
228
248

MY DEFECTS ( New ) ( Edit ) ( Update ) ( Reassign ) ( Export ) ( Delete )

| PAGE: | ☐ | NAME | PROJECT⇵ | DATE EDITED⇵ | START DATE⇵ | FINISH DATE⇵ | PRIORITY⇵ | % COMPLETE⇵ | STATUS⇵ |
|---|---|---|---|---|---|---|---|---|---|
| page 1 | ☐ 231 | Security storage | Release 4 2006 | 04/26/2006 | 03/30/2006 | 03/31/2006 | Critical | 15 | New |
| page 2 | ☐ 230 | Duplicate Run Date | Release3 2005 | 04/25/2006 | 02/27/2005 | 04/05/2006 | Major | (91) | New |
| | ☐ 229 | Rescheduling Requirement group | Release 4 2006 | 04/25/2006 | 03/25/2006 | 04/04/2006 | Critical | 90 | New |
| | ☐ 228 | Requirement date editing | Release 4 2006 | 04/14/2006 | 03/31/2006 | 04/05/2006 | Critical | 90 | New |
| | ☐ 227 | Better error message on Prj Reschedule | Release 4 2006 | 04/14/2006 | | | Critical | 0 | New |
| | ☐ 226 | Build changes error with date | Release 4 2006 | 04/09/2006 | 07/10/2006 | 07/21/2006 | Critical | 0 | New |
| | ☐ 225 | Moving Children not re-setting grouper | Release 4 2006 | 04/10/2006 | 06/05/2006 | 06/16/2006 | Critical | 50 | New |
| | ☐ 217 | Delete key on non requirement | Release 4 2006 | 03/16/2006 | 05/18/2006 | 05/19/2006 | Serious | 80 | In Progress |
| | ☐ 206 | Change Index tab to Products | Lakes Gaming Project 1 | 02/02/2006 | 06/06/2006 | 06/09/2006 | Major | 80 | New |
| | ☐ 205 | Change Products Name on tree | Lakes Gaming Project 1 | 02/02/2006 | 07/12/2006 | 07/14/2006 | Major | 25 | New |

251 252 254 256 260

ISSUES

230

My Dashboard
- Home
- Edit Account
- Products
  - Cohere
    - Release1 2005
    - Release x Future
    - Release2 2005
    - Release3 2005
      - Assignments
      - Milestones
      - Requirements
      - Test
      - Defects
      - Reports
      - Config. Mgmt
      - Issues
      - Setup
    - Release 4 2006
    - Release 5 2006
      - Assignments
      - Milestones
      - Requirements
      - Test
      - Defects
      - Reports
      - Config. Mgmt
      - Issues
      - Setup My Dashboard
Administration

AUTOMATED METHOD FOR COHERENT PROJECT MANAGEMENT

FIELD OF THE INVENTION

The present invention relates to automated methods for project management and, more particularly, to a web-based computer system for multi-level project management.

BACKGROUND OF THE INVENTION

Business oriented software programs currently exist for organizing and tracking items such as email, tasks, schedules and contacts on a personal computer. Such programs have graphic user interface (GUI) displays that are capable of personalization by users within a limited set of parameters. Tracking is usually accomplished by way of reminder reports or popup windows, where initial conditions have been input by a user input from a device such as a computer keyboard.

While such programs are useful for scheduling meetings, tracking deadlines and the like for individual tasks, they do not provide a coherent integrated method for managing large, complex projects using easy-to-discern visual displays. This is especially true for long-term projects, such as building construction projects, where many persons are tasked with numerous different jobs and requirements. Additionally, many tasks may depend on the status of others and it would be desirable to reflect the health of such requirements in terms of its environmental or situational factors. Still further, the ability to change assignments and requirements on-the-fly while updating the entire system is desirable. While missing in current systems, it would also be desirable to dynamically generate forms tailored to each user for modifying data so as to promote ease of use while providing system security.

The present invention addresses the need for managing such complex projects by providing an automated interactive system for coherently managing a complex project involving a number of users connected to an Internet client server. Displayed forms are dynamically generated and tailored for each user according to the user's needs and security status.

SUMMARY OF THE INVENTION

A coherent interactive project management system has a dashboard including a graphic user interface ("GUI") in communication with a GUI engine, where the dashboard provides links to a plurality of differing interactive hierarchical display screens. A data engine is connected to transmit information to and receive information from the dashboard, wherein each of a plurality of users have access to a user-specific version of the dashboard, where the user-specific version controls displays of and access to information to information applying to a specific user, and the specific user employs the user-specific version of the dashboard for requesting, modifying and sharing information through the data engine. The GUI engine includes means for dynamically generating enterable forms used for interactively adding or modifying data available through the data engine, where the dynamically generated enterable forms are customized for each of the plurality of users.

BRIEF DESCRIPTION OF THE DRAWINGS

FIG. 7A shows an example of a computer screen representation of a product display as employed in one embodiment of the invention.

FIG. 7B shows an example of a computer screen representation of a project display as employed in one embodiment of the invention.

FIG. 8 shows an example of a computer screen representation of a home screen display in accordance with one embodiment of the invention.

FIG. 10 shows an example of a computer screen representation of a requirements display as employed in the present invention.

FIG. 11 shows an example of a computer screen representation of an enterable dependency display.

DETAILED DESCRIPTION OF THE PREFERRED EMBODIMENTS

While the invention is described herein with respect to specific examples of the preferred embodiments, it will be understood that this is done by way of explanation and the invention is not limited by the examples.

Figure 1:
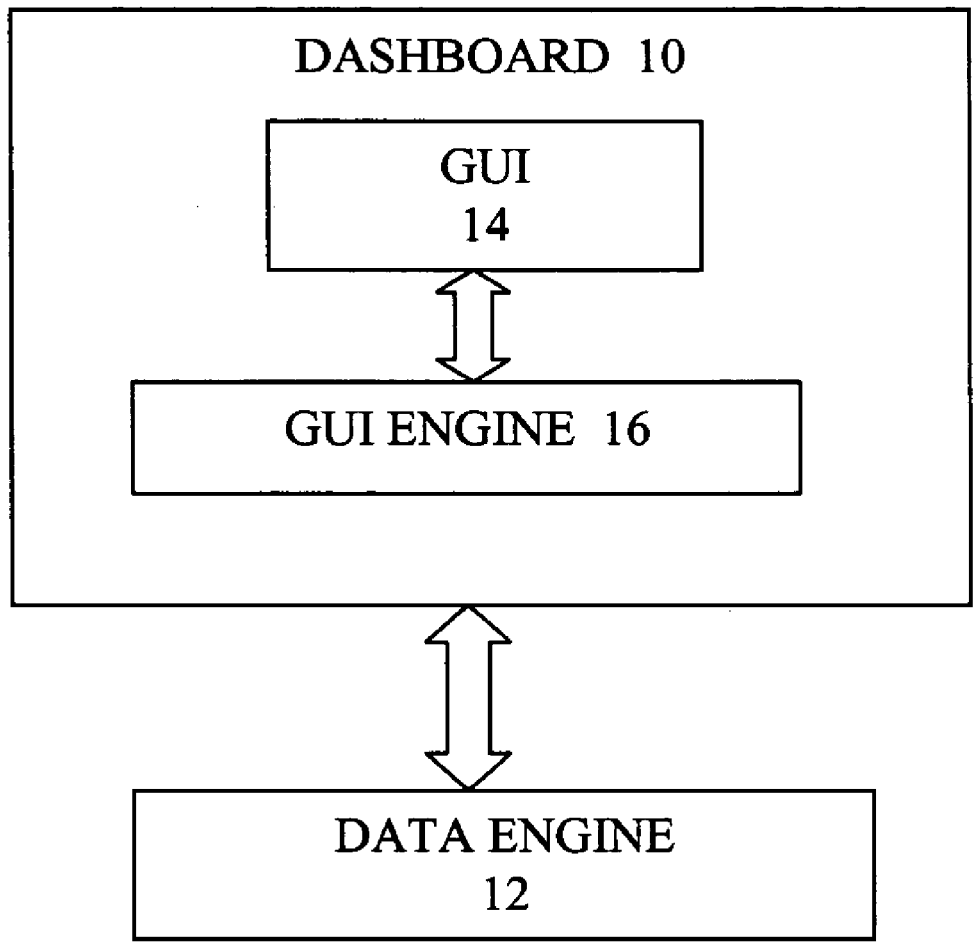
FIG. 1 schematically shows a high-level block diagram of the major systems of a coherent interactive project management system as employed in accordance with one example of the present invention.

Referring now to FIG. 1, there shown is a high-level block diagram of the major systems of a coherent interactive project management system as employed in accordance with the present invention. The system 5 includes a dashboard 10 and a data engine 12. As explained in more detail below, the data engine 12 transmits and receives information from the dashboard 10. In one embodiment of the invention the dashboard 10 includes a graphic user interface ("GUI") 14 in communication with a GUI engine 16. The system 5 may be distributed on one or computers and/or computer servers, where the computers and/or computer client servers are accessible through an Internet connection or other computer network. The GUI 14, GUI engine 16 and data engine 12 are preferably embodied in computer software programs executed using standard computer apparatus such as, for example, one or more computer processing units, memory media, data busses and network communication interfaces. Software programs may be written using a standard programming language, such as, for example JAVA programming language.

Figure 3:
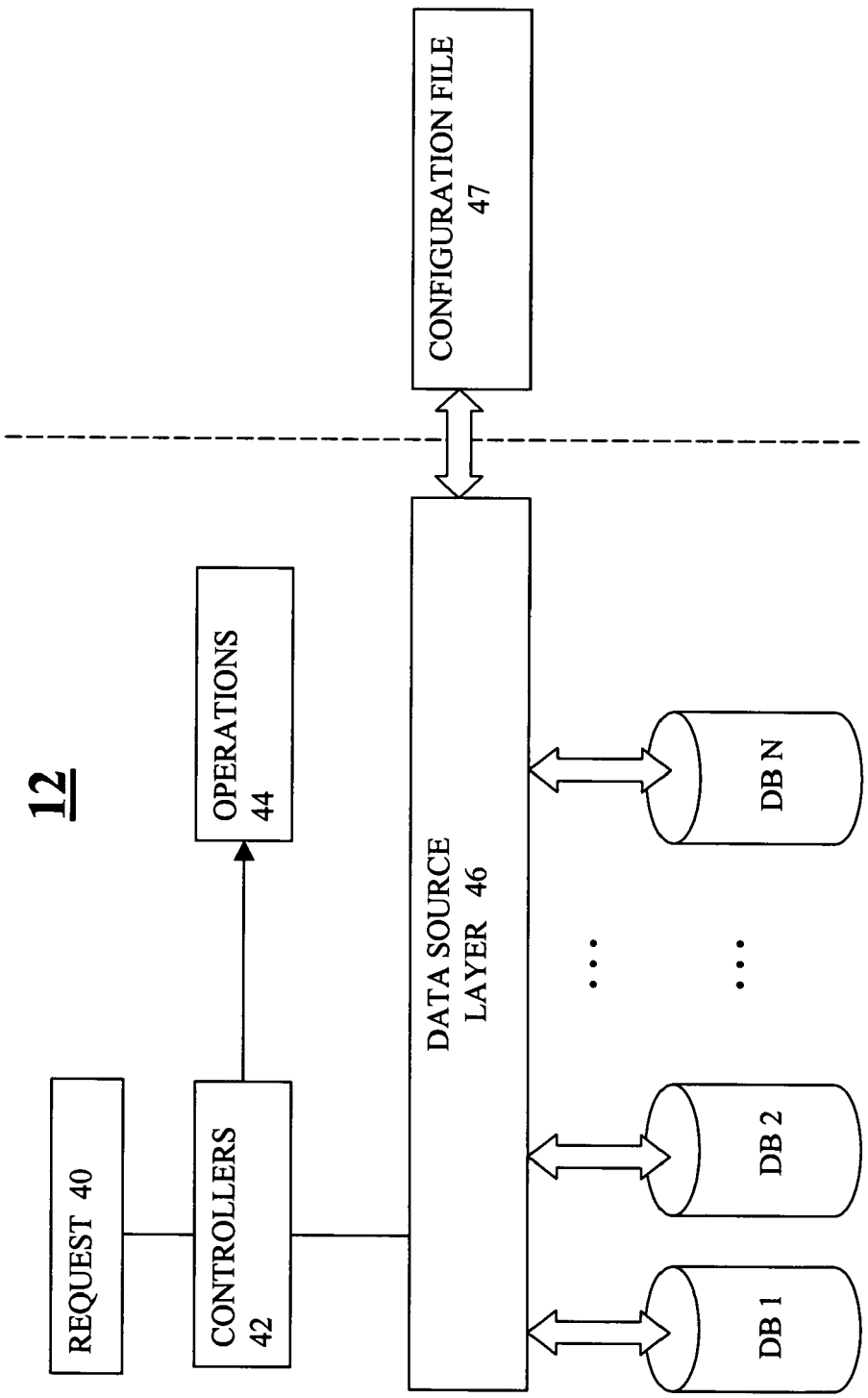
FIG. 3 schematically shows a block diagram of a data engine as employed in accordance with one example of the present invention.

One useful embodiment of a coherent interactive project management system constructed in accordance with the teachings of the present invention employs data objects including types and attributes. "Types" as used in the context of the management system of the present invention include actions or tasks external to the system itself that are tracked as they progress towards a specified result (e.g. constructing a building, buying supplies, etc.). For each type a list of attributes is defined. A configuration file 47 (as best shown in FIG. 3) holds the predefined definitions of types and associated attributes.

Specific definitions and data values for types may be interactively entered from a keyboard or equivalent using the GUI and dynamically generated input forms to meet the criteria of the specific definitions and data values. The dynamically generated input forms include the attributes specific to the type specified by a user. The specific definitions and data values are returned to the data engine and stored in a database associated with the selected type. Using a discover attributes module as described below, data may be broken down into objects. For example, a set of descriptive attributes is associated with a common data type called a requirement type. All objects have attributes and all types have a set or list of attributes. Attributes can be added dynamically through calculations or other automated processes. Each attribute has associated rules, including special rules such as, for example, constraints on requirements like time constraints or other types of constraints.

Attributes may be shared among types. For example, a "name" attribute may comprise a limit on the number of characters allowed for naming a type. Thus attributes may be defined by, for example, words, characters and values, and may be used to implement rules governing parameters for a selected type or types.

Milestones as used herein are specific dates that are set at a project level to signify major project steps. More than one milestone may be set per project. The benefit of setting a milestone to associate a specific milestone date with other requirements. Valid milestone operations include adding a new milestone, editing a current milestone or deleting a milestone. A qualified user may interactively enter a milestone name and date.

Figure 2:
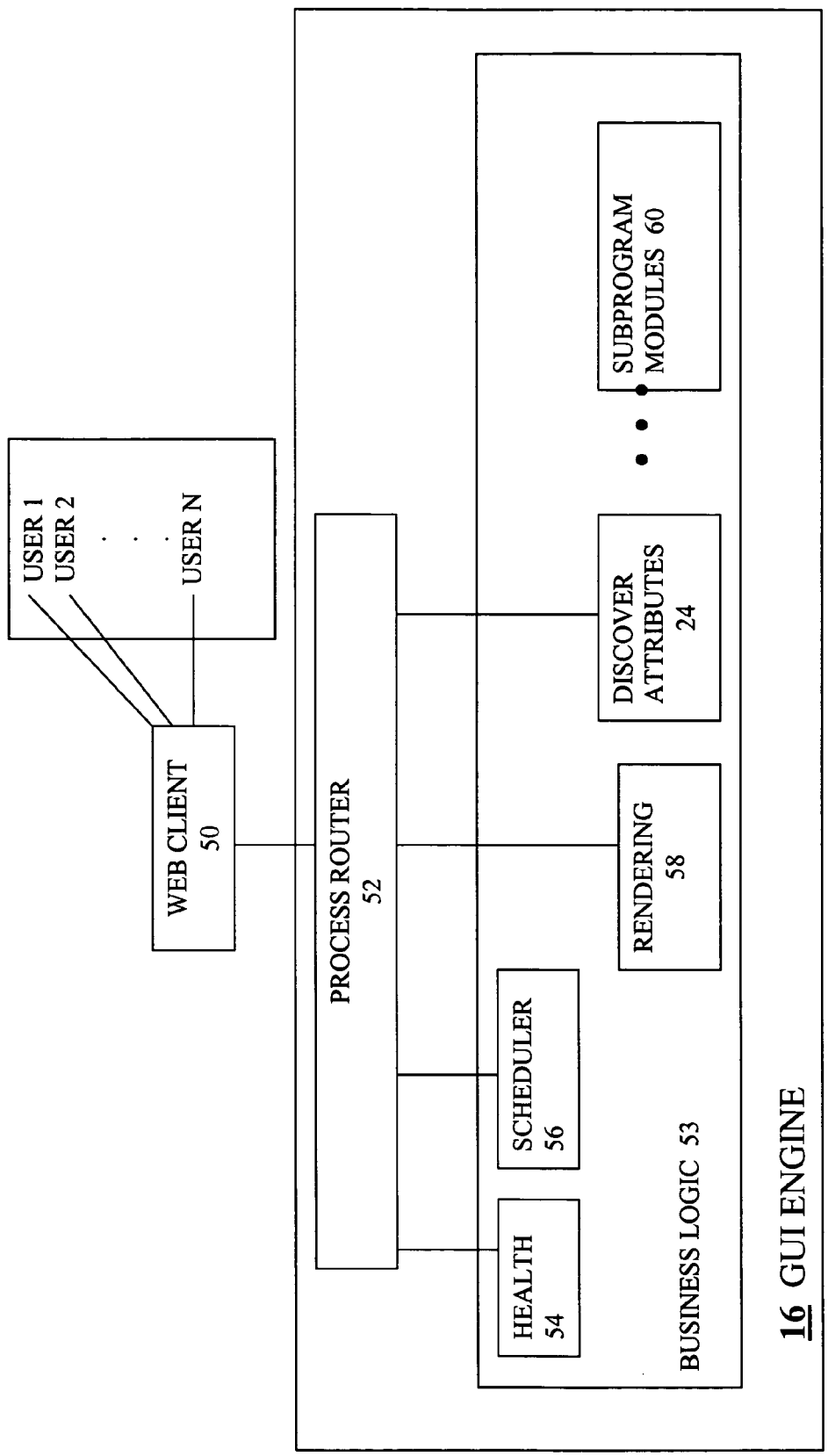
FIG. 2 schematically shows a more detailed block diagram of a graphic user interface engine and web client configuration as employed in accordance with one example of the present invention.

Referring now to FIG. 2 there shown schematically is a more detailed block diagram of a graphic user interface engine and web client configuration as employed in accordance with the present invention. The GUI engine 16 includes a process router 52 in communication with a web client 50. The web client 50 typically resides outside of the GUI and GUI interface, as for example, in an Internet server or a personal computer. The process router 52 is also connected to transmit and receive information from business logic 53. The business logic 53 includes a plurality of software program modules including a health module 54, a scheduler 56, a rendering module 58, a discover attributes module 24 and other subprogram modules 60. A plurality of users 1, 2 . . . N are allowed access to the web client. Users may be assigned different access levels to the information such that not all users will have access to the same information.

The scheduler 56 includes a computer program module for processing data, particularly data related to requirements and milestones, and more particularly data specifying dates. As users input or modify start dates or finish dates for requirements, the scheduler adjusts dates for requirements dependent on the new or modified requirement. When accessed, the scheduler generates questions for the user's response, where the questions are typically related to milestones.

Figure 2A:
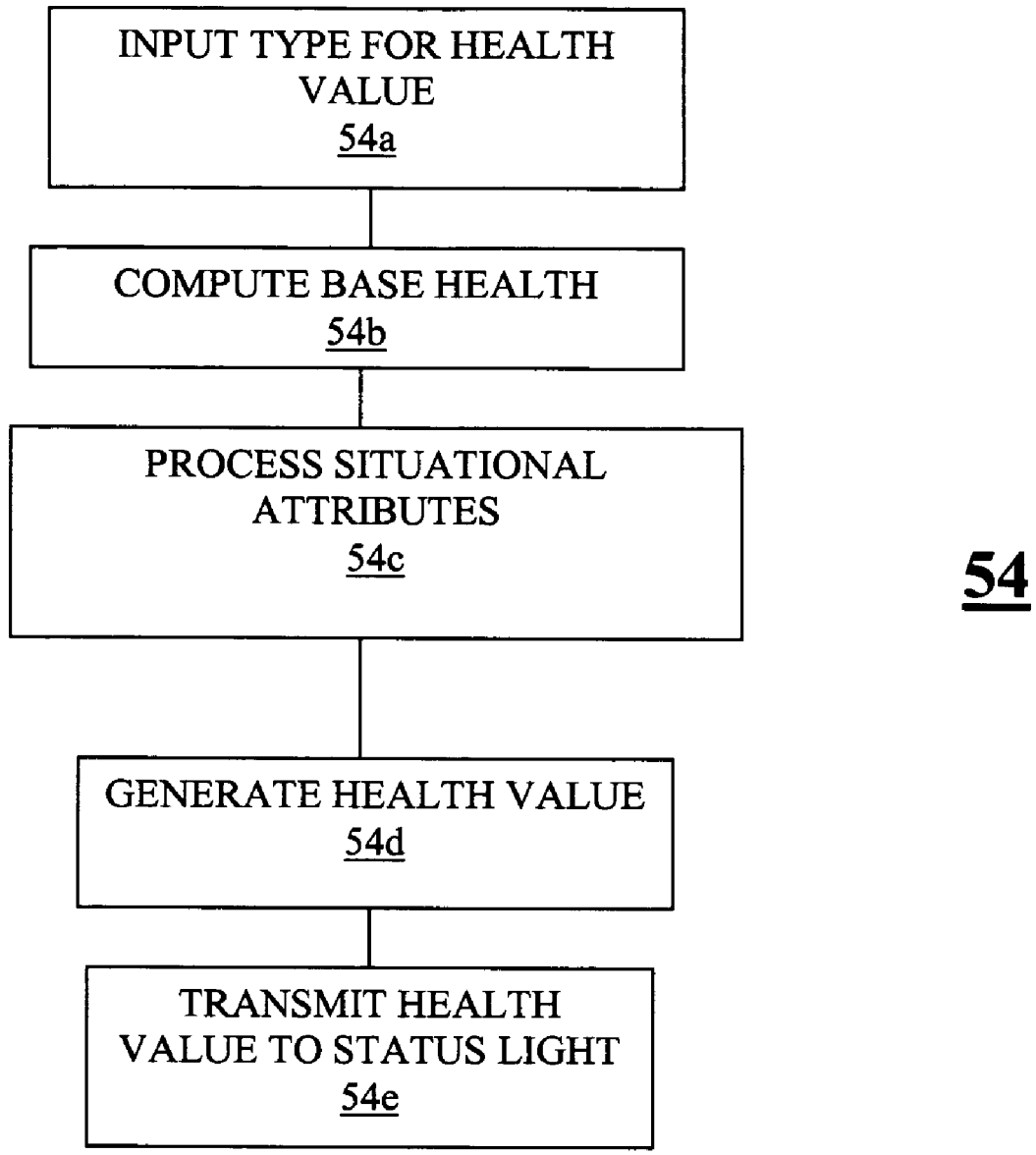
FIG. 2A schematically shows a block flow diagram of health module as employed in accordance with one example of the present invention.

Referring now to FIG. 2A there shown schematically is a block flow diagram of a health module as employed in accordance with the present invention. Each type may have an associated health module 54 where each health module holds pre-programmed logic for calculating health values. The pre-programmed logic is specific to each project. Similar kinds of projects may have similar health logic. A health value is ultimately presented on a display screen as a status light where a particular color represents a health indication of the type. The health module operates to discover types, dependencies or objects that present problems or potential problems for the managed process. The health module 54 operates to process data related to the type being health evaluated 54a using the following steps:

Computing a base health value at step 54b from attributes and data including initial conditions (e.g. a start date) and current information such as, for example, percentage completion of a requirement;

Optionally processing situational attributes at step 54c affecting the environment of the type; and Generating a health status value as, for example, a percentage from 0-200%. In one useful example embodiment, any health status value greater than 100% indicates that the health of the evaluated type is on schedule or ahead of scheduled milestones.

While there are various methods available for processing the health value, calculations may include a plurality of situational attributes such as the completion percentage and dependency status. An example of a simple case is one wherein there are no situational attributes and health is calculated by multiplying the completion status by a factor normalized to a scale of 200%. If included, situational attributes may include factors such as whether the selected type is dependent on other requirements or tasks and the status of any such pre-requisite requirements or tasks. To arrive at a health value each attribute and situational attribute has an assigned or calculated value corresponding to its effect on the subject requirement. The overall calculated health value for the subject requirement is normalized to a percentage representing values translated into status light colors. In one example the status light colors include White=Not Started, Green=On Track, Yellow=At Risk, Red=In Trouble and Blue=Complete. The situational attributes may be weighted according to their criticality to a requirement if desired.

By way of a generic example, consider a case for calculating health for a requirement type. A health module process computes a base health value by analyzing major attribute values, such as scheduled time period, current date, current work done, etc. The analysis is based on numerical values, is outside of the context of the rest of the project and yields a base or "logical" health value for the requirement type.

The base health value may be further modified in an environmental stage by accounting for environmental or situational factors regarding other elements in the project. For example, if a requirement is critical to timely completion of a project, even minor slips can have large impacts. In such a case the requirement's health will trend to critical very quickly. In contrast, a requirement that has little impact on the overall scheduled completion of the project may allow for a limited amount of negative factors before the health value indicates that action needs to be taken on the requirement. The manner in which the current requirement's dependencies and dependents are progressing, and the extent to which the requirement is interconnected may also affect the requirement's health. Further, other activities occurring within the project that are related to the requirement such as testing and defect removal may be considered in determining a modified numeric health value for the requirement. Once determined, the modified numeric health value is then used to select a status light color to indicate the current status of the requirement, ranging from red (action needs to be taken) to green (nothing needs to be done).

One example of computer code embodying a health module for creating a base health for a requirement is listed below. A percentage corresponding to the health of a type is generated that represents a percentage of target status. The health value may not be the same as the completion percentage of the requirement type. For example, if a project is halfway through the scheduled time for a requirement type, and the requirement type is 25% complete, the "target percentage" corresponding to target status generated would be 50%, thus reflecting the requirement type completion progress as it compares to the schedule.

An input set processed by the health module may include a predetermined list of requirements, as for example, a list corresponding to the function of a corresponding status light. For example, the health percentage generated may determine the color of a status light representing the health for all requirements on the project, as compared to another status light that may represent the health status for a single requirement.

Since the health module in this example returns a percentage where "0" always means not-started, and "100" always means completed, special cases are accommodated where these end point percentages are determined to be inappropriate in order to reflect the practicalities of a schedule for a given project. For example, if the calculated health falls on one of these values and work should have been started or shouldn't be completed because of known schedule considerations, the health value is incremented to 1 or decremented from 100 as the case may be.

As discussed above, optionally an environmental stage post-calculation process may be used to modify the return of the logical health value (i.e. "reqPerc," from the example computer code below) by applying environmental or situational factors external to the requirements logical schedule. The environmental stage post-calculation process may be specifically defined by the manner in which a given project is treated according to special considerations for project health. Such special considerations are typically defined or enumerated by a project manager. Any processing done in an environmental stage comprises further manipulation of the logical health value generated from the health module. The environmental processing serves to shifting the health value either towards or away from the target percent complete. As an example, consideration might be that work is not done linearly on a task, and is more exponential in shape (i.e. half-way through the schedule, a requirement's target completion percentage is 25%, but 80% of the way through the schedule, the target completion percent is only 75%). In such a case, the environmental stage may shift the health value depending on the scheduled completion rate of a requirement compared to the current schedule status. The environmental stage can include any number of additional considerations and may be largely designed according to reflect the project manager's desired implementation.

Example Health Module Code:

```
float tWork = 0;//total work that should have been completed.
float cWork = 0;//current work completed.
int otWork = 0;//number of reqs that are started ahead of time.
final TimeUnit units = TimeUnit.DAYS;
boolean done = true;
boolean overdue = false;
final Date now = new Date( );
    for( int pos = 0 ; pos < o.size( ) ; ++pos ) {
        final Requirement req = ( Requirement ) o.objectAt( pos );
        final Date start = req.getStartDate( );
        final boolean inScope = start != null && req.getStartDate( ).before( now );
        if( !req.isActive( ) )
            continue;//dont count inactive requirements
        final int perc = req.getPercentCompleted( );
        if( req.isGrouper( ) ) {
          //check dates on grouper.
          if( inScope )
              o.addObjects( req.getRequirements( ) );
          else {
              done = perc == 100;
              if( perc > 0 )
                    ++otWork;
          }
          continue;
        }
        if( !inScope ) {//(i.e. start date is in the future)
            if( perc > 0 )
                    ++otWork;//requirement has
            if( perc != 100 )
                done = false;
            continue;//we dont want to include requirements out of scope in our health calculation.
        }
        final Duration work = req.getDuration( );
        float timeWork;
        float timePassed;
        //work time, use scheduled time unless not available, then use real time. if 0, treat as 1 hour.
        timeWork = req.getFinishDate( ) == null ? work == null || work.getTime( ) == 0
    ? 1 : work.conver( units ) : TimeUtil.workDaysCount( 5 , start ,
```

```
req.getFinishDate( ) ) ;
       if( timeWork == 0 )
         ++timeWork;
       timePassed = perc == 100 ? timeWork : TimeUtil.workDaysCount( 5 , start ,
now );
       if( perc == 100 ) {//completed
           cWork += timeWork;
           tWork += timeWork;
       } else if( perc != 0 ) {//zero percent will not matter.
           final float maxWork = timePassed * 2;//ensures large reqs finished way
ahead do not mask issues.
           final float ratedWork = timeWork * perc / 100;
           cWork += ratedWork > maxWork ? maxWork : ratedWork;
           if( timePassed > timeWork ) {
               tWork += timeWork;
           } else {
               tWork += timePassed;
           }
           done = false;
       } else {//at or past start , but nothing done.
           tWork += timePassed;
           done = false;
       }
   }
}
int reqPerc;
if( cWork == 0 ) {//no work done.
    if( done )
        reqPerc = 100;//blue;
    else if( tWork != 0)
        reqPerc = 1;//red
    else if( otWork != 0)
        reqPerc = 115;//green;
    else
        reqPerc = 0;//white;
} else if( done ) {
    reqPerc = 100;//blue
} else {//we have work done.
    reqPerc = ( int ) ( cWork / tWork * 100 );
    if( reqPerc == 100 )
        reqPerc = 115;
}
return new Integer( reqPerc );
```

Referring now to FIG. 3 there shown schematically is a block diagram of a data engine and configuration file as employed in accordance with the present invention. The data engine 12 includes a request software module 40, controllers 42, and a software module for operations 44, a data source layer 46, and a plurality of databases DB1, DB2 . . . DBN. The data engine processes inputs from a number of sources including accounting databases, relational databases and other types of data handlers. In operation the data engine can read and modify information from the configuration file 47.

As noted above, the configuration file 47 contains predefined attributes and types specific to a user's project. In a preferred embodiment, a computer system in accordance with the invention can be configured to change definitions of types and attributes to match the needs of a user and automatically include the customized information in the configuration file 47. The custom definitions have an impact on other facets of the computer system such as dynamic form generation and scheduling.

Figure 4:
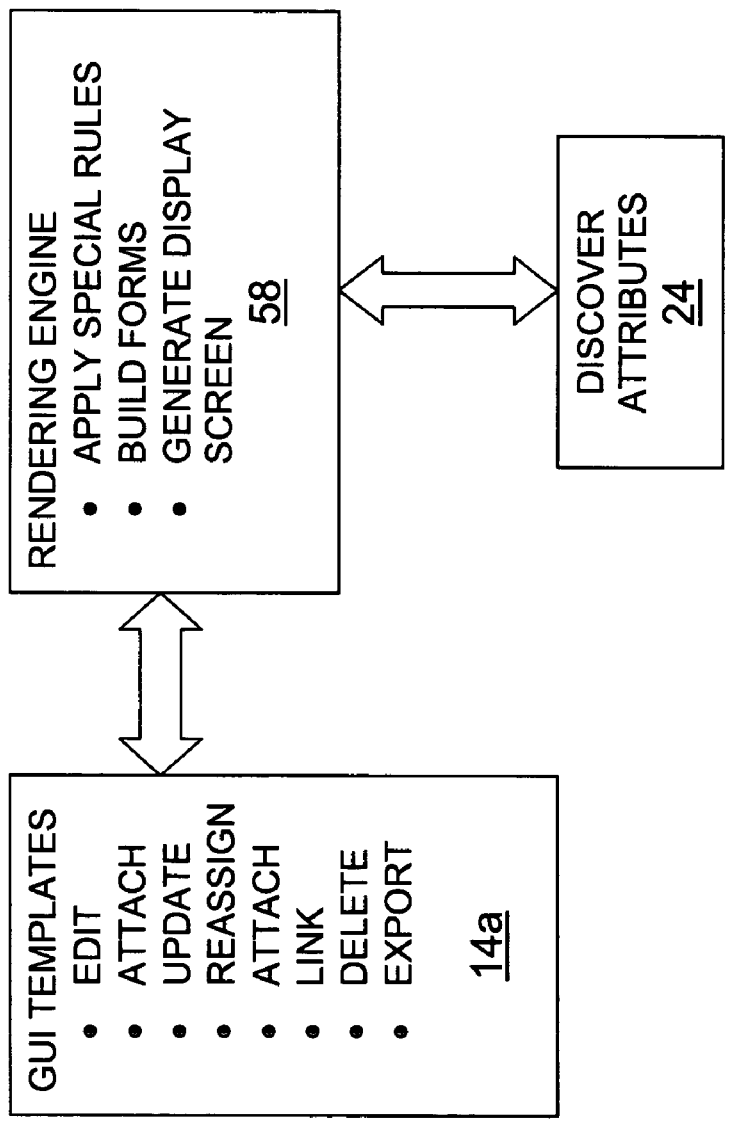
FIG. 4 schematically shows a block flow diagram of GUI template programs as in operation with a rendering engine for displays as employed in accordance with one example of the present invention.

Referring now to FIG. 4, there shown schematically is a block flow diagram of GUI template programs as in operation with a rendering engine for displays as employed in accordance with the present invention. The GUI includes a plurality of template programs 14a including, for example, UPDATE, REASSIGN, ATTACH, LINK, DELETE AND EXPORT. The template programs perform routine programming functions and are generally made available to users having appropriate security access clearance when the users activate a corresponding display button. Display generation and dynamic form building for the template programs are carried out in the rendering engine 58. Attributes used in building forms are supplied by the discover attributes module 24.

Figure 4A:
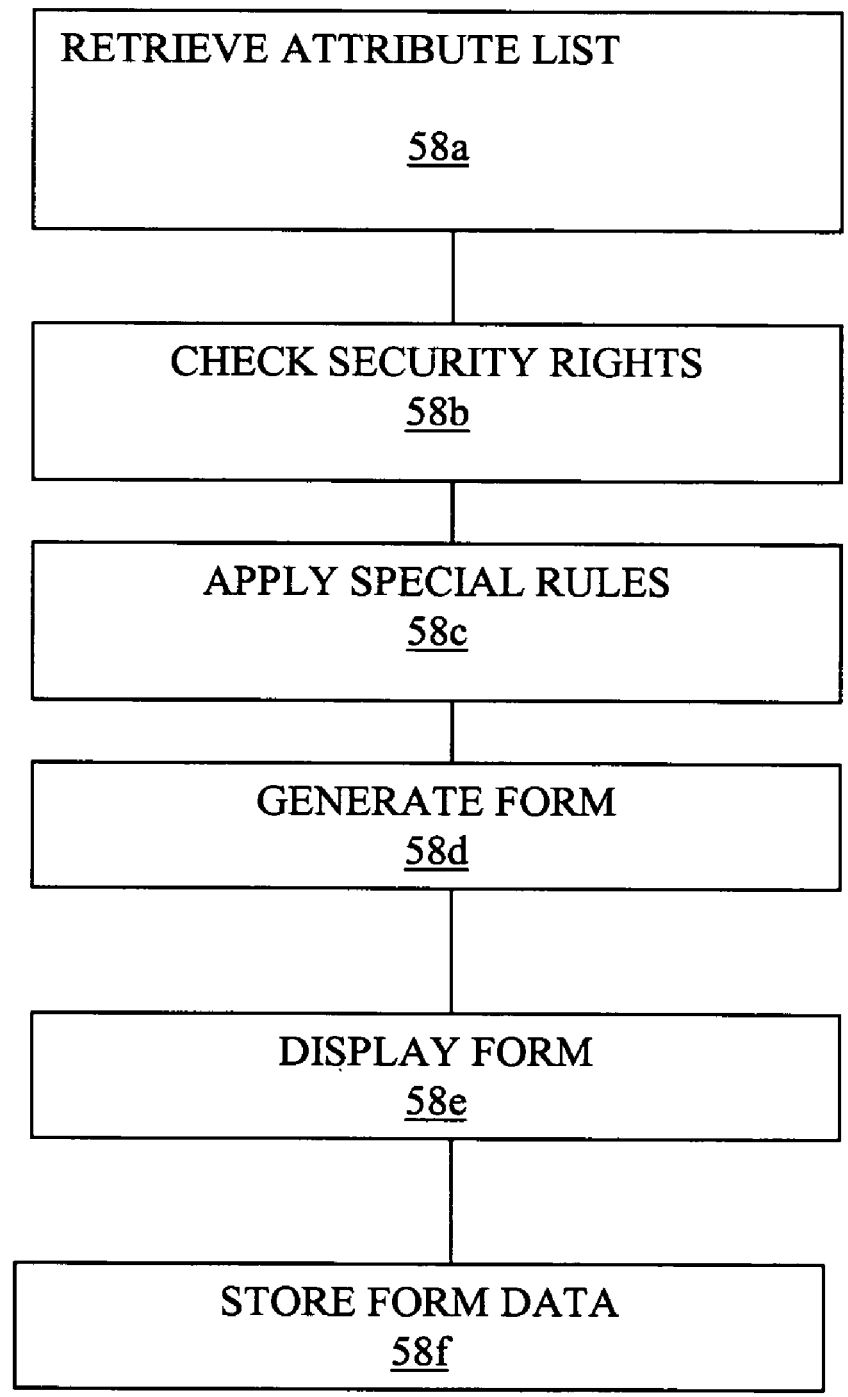
FIG. 4A schematically shows a flow diagram of method steps employed to dynamically build user forms for various interactive actions.

Referring now to FIG. 4A, a flow diagram shows the steps employed to dynamically build user forms for various interactive actions. The rendering engine 58 that builds GUI display screens in response to user requests also dynamically generates form fields. The process steps for form building include retrieving an attribute list of a selected type requested for entry or modification by a user at step 58a. In operation, the discover attributes module 24 operates to query the configuration file containing the base definitions of the selected type and the attributes associated with the selected type. Security rights associated with the requester may advantageously be checked against at least some of the attributes in the selected type attribute list at step 58b.

If applicable, special rules are applied at step 58c before generating a form. Some types have associated special rules based on the action requested. Special rules comprise programs having predetermined logic for particular situations and requests. Special rules may allow departures from standard processes or may handle actions that can't be handled generically. For example, a form for a requirement type includes special rules for START, FINISH and DURATION attributes because the attributes are related. A special rule may be included to calculate a FINISH date given a START date and a DURATION. Thus Special Rules may include software routines for automatically calculating outcomes for related attributes or types.

At step 58*d*, the rendering module generates the requested form based on the attribute list, user security rights and application of special rules. Any functions not appropriate to the user's security level will be filtered out and will not appear on the generated form. Thus, forms are dynamically generated and customized for each user. The generated form is displayed for completion by the user at step 58*e*. Interactively entered data is routed to the data engine and then stored in databases selected by the data engine at step 58*f*. The user may then complete the form by adding or modifying data. Some changes will affect and appear on dashboards of others, as for example, reassigning tasks to different personnel.

Figure 5:
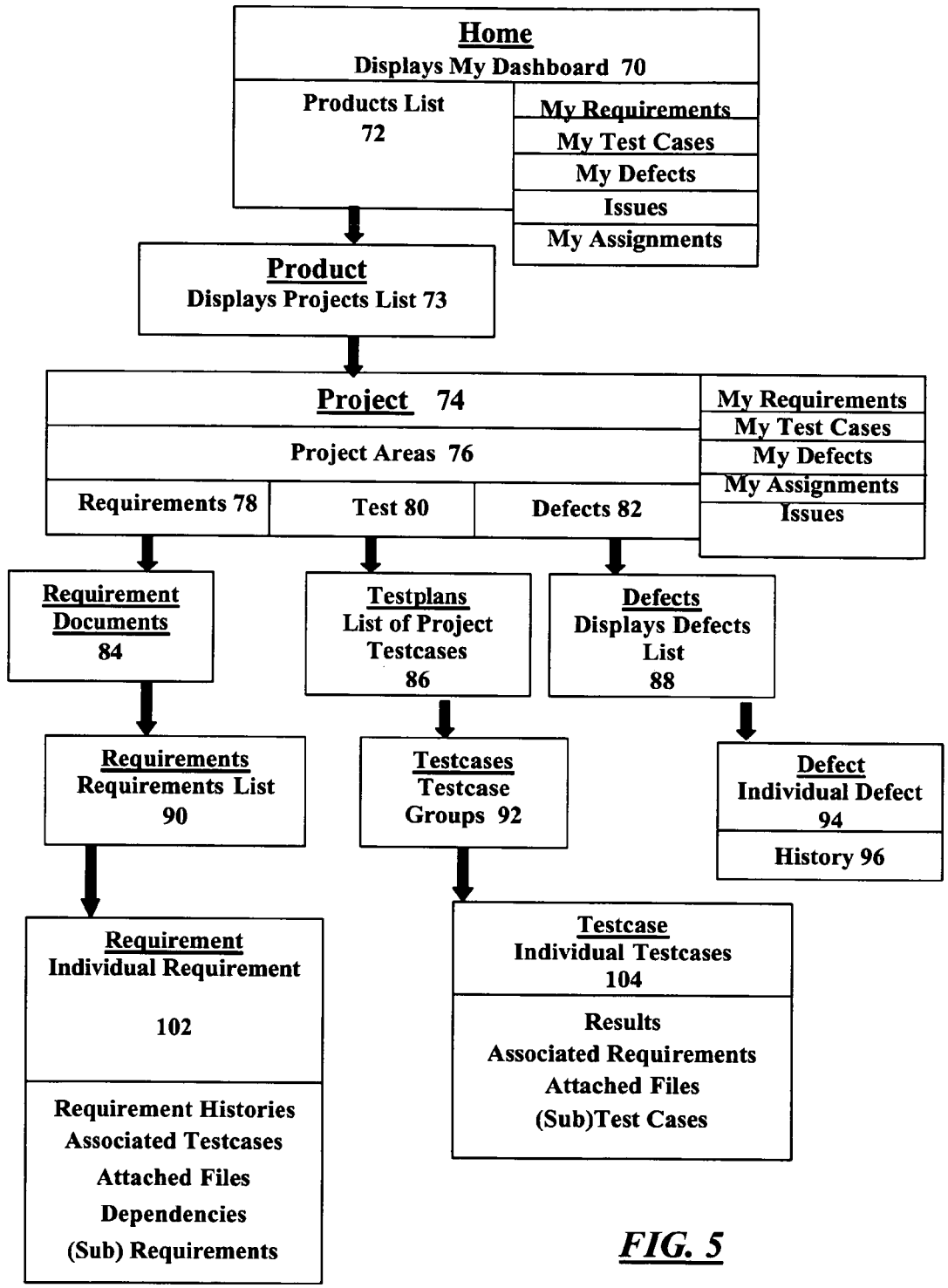
FIG. 5 schematically shows a block diagram of a major display hierarchy as employed in accordance with one example of the present invention.

Referring now to FIG. 5, there shown schematically is a block diagram of a major display hierarchy as employed in accordance with the present invention. 1. Various display levels correspond to screen displays, which, in turn, may generally correspond to predefine types based on a project's intended result or user's specifications.

The major display hierarchy has a Home level 70 as the highest display including a Products List 72 linked to a Product 73. The Home level displays a GUI interface called "My Dashboard" that is a screen display of the dashboard 10. Every user of the system has access to a version of the dashboard 10 with information specific to the user's information requirements. The Products List display 73 links to the Project display 74, which, in turn, links to one or more Project Areas 76. Each Project Area 76 is associated with a Requirements display 78, a Test display 80 and a Defects display 82.

The Requirements display 78 links to a set of lower level displays including a Requirement Documents display 84 and a list of Requirements 90 having one or more individual Requirements 102. The Test display 80 links to another set of lower level displays including a Testplans display 86 and a set of Testcases 92 having one or more individual Testcases 104. The Defects display 82 links to another set of lower level displays including a Defects List display 88 having an Individual Defects list 94 and a History display 96.

In the preferred embodiment of the invention the displays are interactive and made available to users depending upon a level of access assigned to each user. Users with higher security level assignments will have access to more information and actions than users with lower level security assignments. Security levels may be interactively or automatically assigned and associated with each user. While each user has access to a set of dashboard displays, each dashboard is configured to show information required by and tailored to an individual user. Not all users will be allowed access to all information in the system. The various displays operate in a similar manner using many of the same buttons, icons, names and other indicators. To avoid repetition In the interest of clarity, selected displays are described herein in detail and it will be understood that the remaining displays operate in a similar manner. Enterable displays are somewhat different and are also described below.

Figure 6:
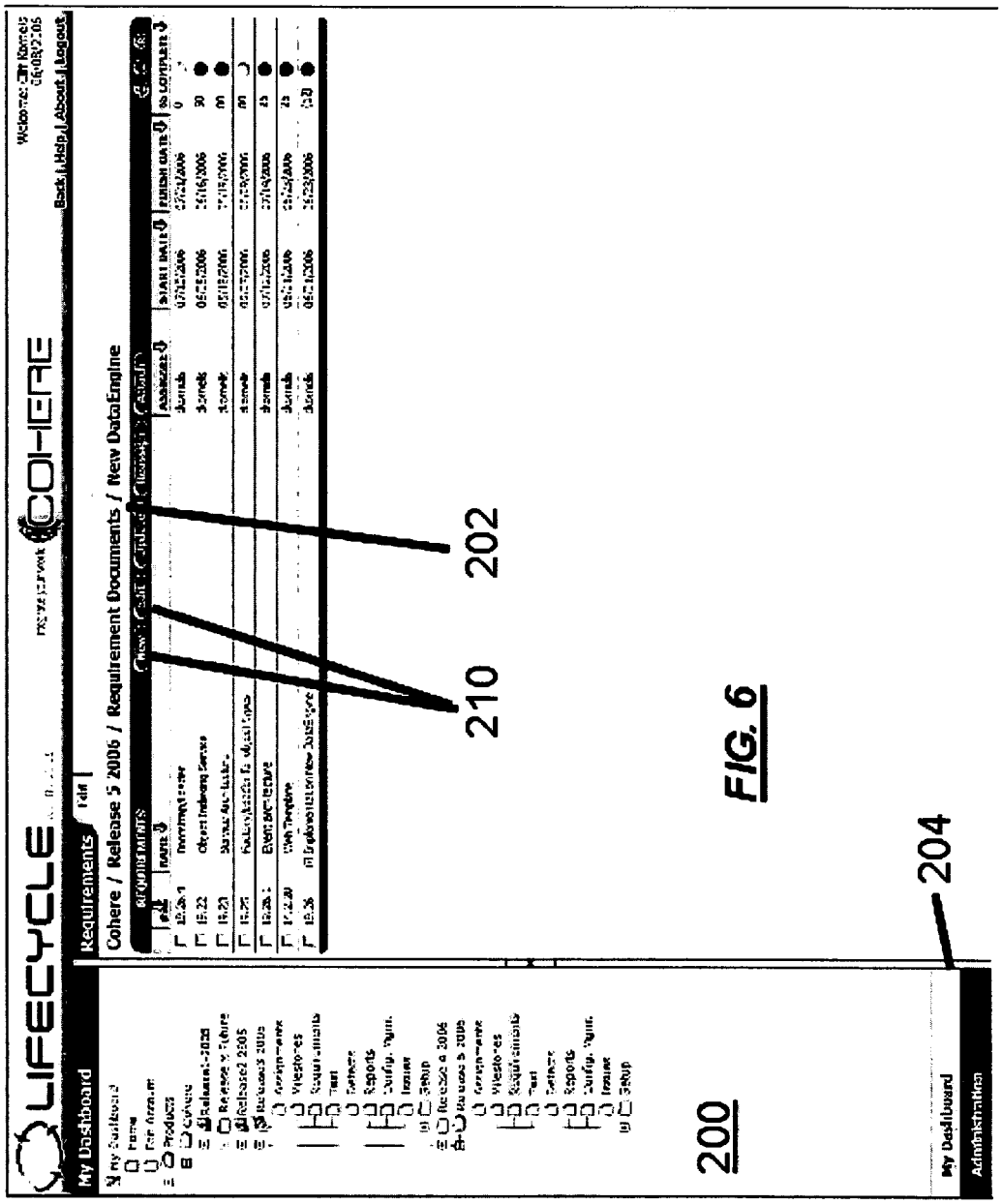
FIG. 6 is a computer screen representation of a requirements display as employed in accordance with one example of the present invention.

Referring now to FIG. 6 there shown is an example of a computer screen representation of a requirements page display as employed in accordance with the present invention. In the preferred embodiment, Navigation through the system is designed to be user friendly by providing a navigation column 200, system locator 202, common buttons and tool bars, by minimizing the number of different displays, displaying only the information that is pertinent to that area and using similar operations across all displays. The user may choose from several navigation methods to transition from one display in the system to another. The user can move through the system displays by selecting the appropriate folder from the left hand navigation column 200, using the system locator 202 at the top of each display, using the common buttons and tool bars within the display areas or using the back button at the top right tool bar to page back through the displays.

The buttons 204 at the bottom of the navigation column determine the navigation mode. In the example embodiment the buttons 204 are named "My Dashboard" and "Administration." A "My Dashboard" mode navigates the user through all the displays that are specific to that user, starting with their Home Display. Using the folder hierarchy on the navigation column 200 to select a display shows the user's specific information for an item and also displays other user's information for the same item. An "Administration" mode may be used by system administrators to through the system set-up displays. An individual user will only be able to move to those displays for which the user has been granted access by the system administrator or other controller.

The system locator 202 preferably presents at the top of each display and indicates the current display's relationship and hierarchy within the system. For example, the first name may be the Product Name, followed by the Project Name for each display. The example display also includes a requirements type display. The names on the system locator 202 are active so that selecting them by activating a pointer such as by double clicking a mouse brings the user directly to the selected system location.

A plurality of buttons 210 is included for selection. Only those buttons that are appropriate, currently valid, and for which the user has been granted access to use will be displayed on a selected user's dashboard and lower level displays. Further, the buttons may advantageously be color dependent. A blue button color means the appropriate conditions are in place for the button function to be active. A grey button color means it is currently not active and invalid to use. For instance, "Edit" and "Reassign" are both appropriate button functions to be used from the Product display, but when more than one requirement is selected at one time the "Edit" button is inactivated and changed to a grey color since the edit function is only valid when one item is selected at the same time. Under this scenario, where two or more items are selected at one time, the "Reassign" button is a blue color because it is valid to use this operation when more than one item is selected at the same time.

Figure 7A:
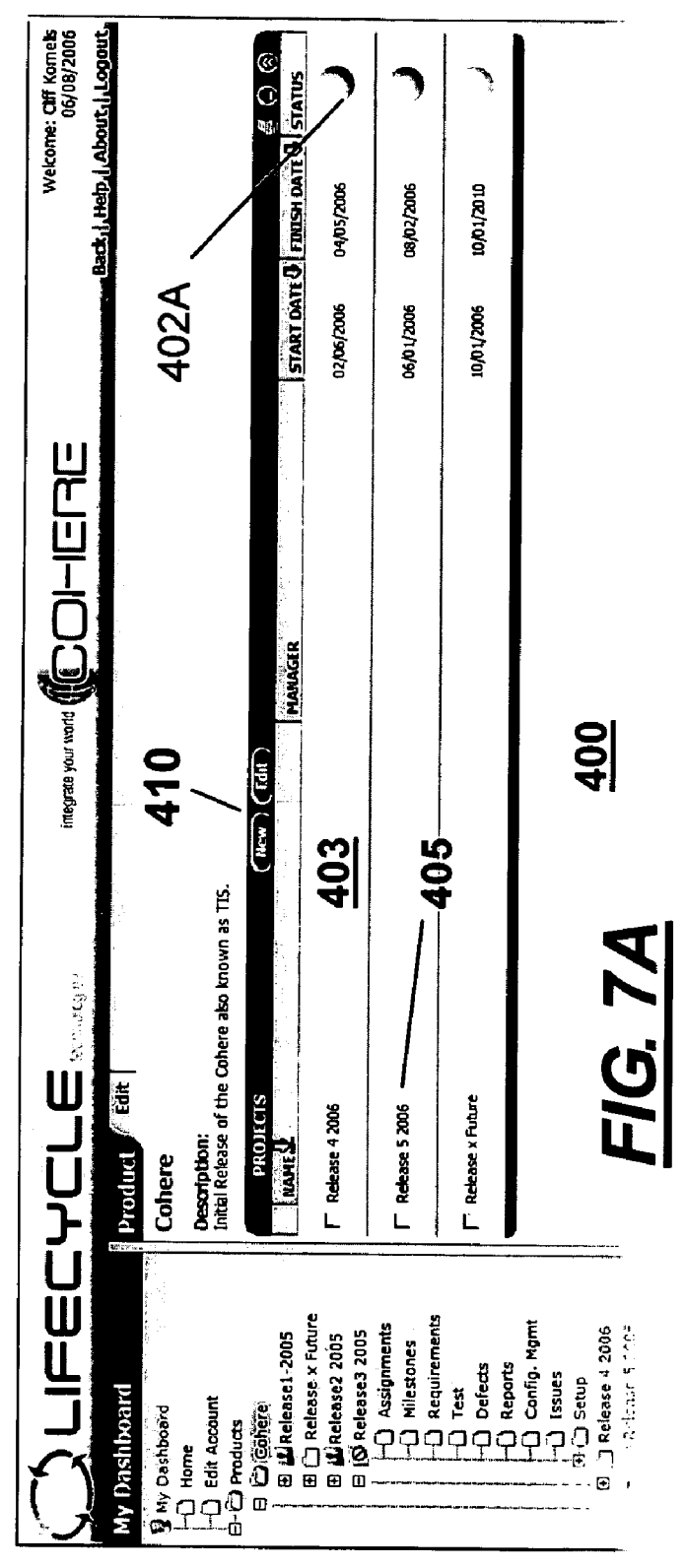

Referring now to FIG. 7A, there shown is an example of a computer screen representation of a product display as employed in one embodiment of the invention. Selecting on an individual Product from the Home display 70 (as shown in FIG. 5) will bring up a Product Display screen 400. The Product Display screen 400 has a description of the selected product or products and includes a Projects section 403 having a Projects list 405.

The Projects section 403 includes one or more status light indicators 402A for indicating completion status and toolbar buttons 410. A user may select one or more of the toolbar buttons 410 to change information related to a selected project. Note not all buttons may be available since they depend on the level of access granted to a user. Selecting a "New" button will bring up the enterable New display where Projects can be added to that same Product. An "Edit" button is activated by first selecting an individual Project from the Projects list 405. The selected item may be indicated with a check mark being displayed in the box to the left of it. Note, in a preferred embodiment, only one item in each section can be selected at a time when using the "Edit" button. Selecting the "Edit" button will bring up an enterable display where changes can be made.

Referring now to FIG. 7B there shown is an example of a computer screen representation of a project display as employed in one embodiment of the invention. Selecting a Project from Projects list 405 will bring up the Projects Display screen 404. The Project Display screen 404 includes an overview section 422, a Project Area section 420, a My Requirements section 426, a My Testcases section 441, a My Defects section 443, an Issues section 428 and a My Assignments section 445.

The overview section 422 preferably shows the names of Projects for the selected Product, Manager(s) assigned to each Project, the Project Start and Finish Dates and status light indicators 430, 432. Other information includes whether this Project is Active (Yes/No) and a Project Description. The overall Project Completion Status is identified by the Starting on Time and Overall Health status light indicators 430, 432. The color of the Status Lights indicates the overall Project status—White=Not Started, Green=In Progress, Yellow=Trending Off Schedule, Red=Critical Off Schedule and Blue=Complete. Starting On Time color 430 indicates the actual Project status as compared to their entered start by date. In one example, Overall Health status light indicator 432 indicates the percent completion status (as compared to their end by date) for all the requirements in this Project. This information is view only and cannot be changed from this screen as it is calculated by the system based on user input.

Status Light Indicators 402 in the Project Areas section 420 identify the overall completion status of the listed Project Areas, that may include, for example, Requirements, Testcases and Defects. The Status Light Indicators 402 are color coded as above to allow the user to easily identify which, if any, of these Project Areas should be addressed.

The Project Display screen 404 also includes a plurality of tool bars including common word tool bars 212 and common system tool bars 214. The location of tool bars on system displays may advantageously be kept consistent allowing a user to quickly become familiarized with their location. For example, the tool bar location for buttons containing words that will affect a specific item (New, Edit, Update, Result, etc.) may be consistently located in the middle of the section's header tool bar or at the very top left of the display next to the display name (Product, Project, etc.). The common system tool bar 214 may advantageously be located at the upper right of every display and pertains to common system functions including "Back", "Help", "About" and "Logout." "Back" brings the user to the previous major display, "Help" provides on-line help information, "About" shows what system software is currently being used and "Logout" systematically logs the user out of the system.

Print, Maximize/Minimize (±) and Page icons may advantageously be consistently located to the far right of the section's header may be generally accepted. When selected, a Print Icon button prints its specific section (Products, Requirements, etc.). The (±) icon is used to maximize or minimize the number of items displayed in that section. A (−) displayed means the entire list is being shown. Selecting on the (−) icon will minimize the list causing only that section's header information to be displayed. The page button represented by a double up (or down) arrow is used to customize the user's screen by grouping long lists of items into pages and displaying the page numbers instead of the entire list. Selecting on the page numbers to the right of the section will fully display that particular page. A plurality of sorter arrows 220 may consistently be located to the right of the section's column descriptor. A sorter arrow determines which column the section is sorted by and if it is in descending (down arrow) or ascending (up arrow) order.

In one example embodiment of the invention, the function of each button is the same even though an enterable display called up by selecting a corresponding word button may vary depending on the section currently being utilized. For example, selecting the "New" button will consistently bring up an enterable display for adding a new item, but the display fields contained within each "New" enterable display are different. Expanding on the example, using the "New" button to either add a New Requirement or to add a New Problem will both activate the rendering engine to generate a "New" enterable display. However, the enterable fields contained on the New Requirement display are different than the enterable fields contained in the New Problem display. Table 1 below indicates how the common buttons are used. System ease-of-use is enhanced by limiting the number of major displays used in the system. The left of Table 1 shows the common word buttons that are used over and over again. The top of Table 1 indicates the minimal amount of displays the system utilizes.

TABLE 1

| Word Buttons | | | | | | Major Displays | | | | | | | | |
|---|---|---|---|---|---|---|---|---|---|---|---|---|---|---|
| | Home | Index-Products | Product | Project | Requirement Documents | Requirements | Requirement | Testplans | Testcases | Testcase | Defects | Defect | Issue | Assignments |
| New | X | X | X | | X | X | X | X | X | X | X | | | | X |
| Edit | X | X | X | X | X | X | X | X | X | X | X | X | X | X |
| Update | X | | | | | X | X | | | | X | X | X | X |
| Reassign | X | | | | | X | X | | X | X | X | X | X | X |
| Export | X | | | | | | | | | | X | X | | |
| Attach | X | | | | | X | X | | | X | | | | X |
| Delete | X | | | X | X | X | X | X | X | X | X | | | X |
| Reschedule | | | | X | | | X | | | | | | | |
| Move | | | | | | | X | | | | | | | |
| Constraints | | | | | | | X | | | | | | | |
| Link to Testcase | | | | | | | X | | | | | | | |
| Link to Defect | | | | | | | | | | X | X | | | |
| Link to Requirement | | | | | | | | | | X | X | | | |

TABLE 1-continued

Major Displays

| Word Buttons | Home | Index-Products | Product | Project | Requirement Documents | Requirements | Requirement | Testplans | Testcases | Testcase | Defects | Defect | Issue | Assignments |
|---|---|---|---|---|---|---|---|---|---|---|---|---|---|---|
| Result |  |  |  |  |  |  |  |  | X | X |  |  |  |  |
| Add |  |  |  |  |  | X |  |  |  |  |  |  |  |  |
| Remove |  |  |  |  |  | X |  |  |  | X |  |  |  |  |

"Edit" and "Reschedule" buttons 412, 414 are used to change parameters pertaining to the selected Project. Selecting the "Edit" button will bring up the enterable Edit display for modifying the Project's Name, Release Name, Release Version, Start by and Finish by Dates, State, Active Status and Description. The Start by Date is the required start date for a Project and not necessarily the exact date that the Project actually starts. The start by date concept versus start on date concept is important since one goal is to manage the system so that start dates can be moved up as much as possible.

Selecting the "Reschedule" button 414 at the top of the Project Display toolbar will bring up an enterable Reschedule Display which will allow the user to reschedule the Start by and/or End by Dates of the Project as a whole. The system scheduler software automatically moves all of the Requirements and any dependent relationships associated with the Project to line up to the new overall schedule by dates. This single step eliminates the need to manually change each items date accordingly. The "Reschedule" button is different then the "Edit" button since changing the dates using the "Edit" button will only change the Project overall dates and will not change the related requirement or dependency dates in that Project. An alarm banner will be displayed indicating any rescheduling conflicts and the new dates will not be submitted to the system until the conflicts have been resolved. Access to the "Reschedule" button is limited to authorized users.

A Testplan Display 86 (as shown in FIG. 5) lists the Testplans for a Project and will be displayed by selecting on the "Test" text in the Project Areas section 420. A Testcases Display 92 (as shown in FIG. 5) lists all the Testcases for the selected Testplan will be displayed by selecting (e.g. double clicking) on an individual Testplan from the TestPlan display. The Testcases section is substantially similar to the My Testcases section 441 described below.

The My Testcases section 441 contains all the Testcases assigned to a user. The My Testcases section 441 displays the Testcase number, "#," (e.g. a unique number automatically assigned by the system), Testcase Name, Test Category Type (e.g. Regression, Function, Acceptance, Performance, Installation, Database Conversion, Memory/Endurance, Configuration/Compatibility, Stress, Usability and Code Coverage), Priority (High, Medium or Low) and current Completion Status (e.g., Passed, Failed, or Can't Run).

The buttons "New", "Edit", "Result", "Reassign", "Link" and "Delete" are part of a toolbar 447 in the My Testcases section header. "New" adds a new Testcase to this section. "Edit" will allow changes to the parameters of a Testcase already in the list. "Result" 221 is a button that is unique to a Testcase and lets the user update the status of the Testcase by selecting from a word list including, for example, Passed, Failed, or Can't Run. "Reassign" enables the user to assign the Testcase to another user if proper authority has been granted. The "Link" button is used to associate a Testcase to a Requirement(s) and/or Defect(s). An authorized user may select the "Delete" button to delete any Testcases so selected. A single Testcase may be selected from the list in order to use the "Edit" or "Link" buttons.

Figure 10:
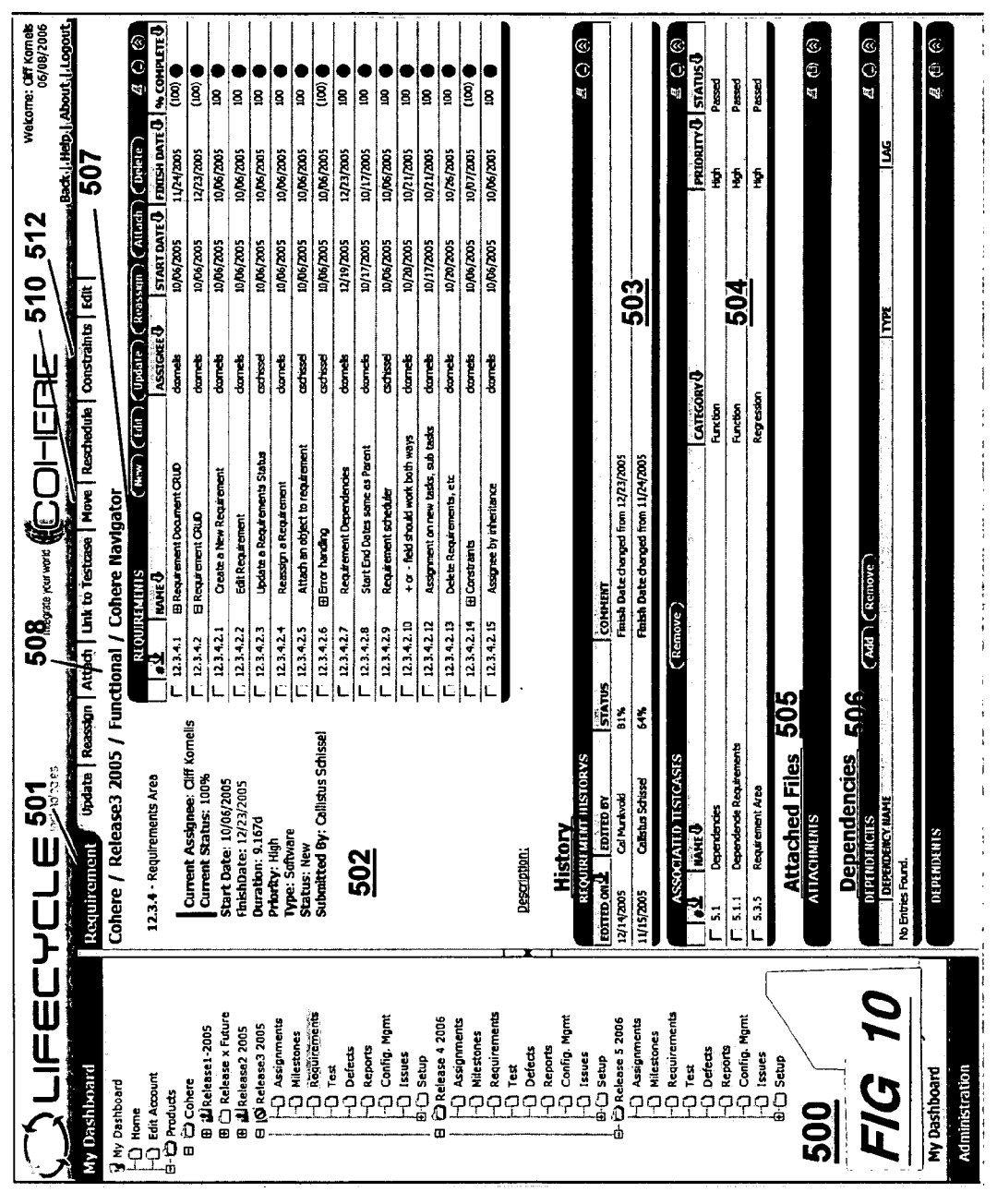

Selecting on a Testcase from the Testcases Display brings up an individual Testcase display (not shown, but analogous to and arranged similarly to FIG. 10 for Requirements). The Testcase Display may include the following sections: 1. Testcase Functions, 2. Testcase Overview, 3. Testcase Results, 4. Associated Requirements and/or Associated Defects, 5. Attached Files and 6. Sub-Testcases. It is beneficial to link a Testcase to a Requirement and/or a Defect for tracking back what Requirement or Defect may be re-run should the Testcase fail. For this reason "Link to Requirement" and "Link to Defect" buttons may advantageously be included in the Testcase display. Any links that have been set will be shown as Associated Requirements and/or Associated Defects.

Selecting a "Link to Requirement" button from the Testcase display will call up a Project Requirements list 90 (as shown, for example, in FIG. 5 and FIG. 10 as list 507). The user selects the Requirements that are to be linked to the displayed Testcase and then selects the "Submit" button. The Requirements list contains the number, "#," assigned by the system, Name, Assignee, Start Date, Finish Date and a numeric % Complete and Status Light Indicator form. In this mode, the fields are preferably view only and cannot be changed. More than one requirement can be linked at a time to the same testcase.

Selecting a "Link to Defect" button from the Testcase display will call up a Project Defect list 88 (as shown in FIG. 5 and similar to My Defects in FIG. 8 for example). The user selects the Defects that are to be linked to this Testcase and then selects the "Submit" button. The Defects list contains a number, "#," assigned to each defect by the system, Name, Assignee, Date Edited, Type, Priority and Status. In this mode, the fields are preferably view only and cannot be changed. More than one defect can be linked at a time to the same testcase.

A Defects display for a Project will be displayed by selecting on the "Defects" text in the Project Areas section 420. The Defects display preferably shows a tracking number, "#," assigned by the system, a Name, an Assignee, a Date Edited, a Type, a Priority and a Status. An Assignee may be selected using a pull down menu proximate the Assignee field. Date Edited displays the date defect in entered or changed. The Type may include Software or Documentation. The Priority is selected from a list including, for example, Critical, Serious, Major or Minor. The status options include, for example, New, In Progress, Work Completed, Feedback, Verified, Deferred, Rejected, Suspended or Closed.

An individual Defect Display for a Project will be displayed by selecting on a single Defect from the Defects display 88 (as shown in FIG. 5 and arranged similarly to FIG. 10). The Defects display may include a plurality of sections such as 1. Defect Functions, 2. Defect Overview and 3. Defect History. The Defect Functions section provides buttons for editing, updating, reassigning and exporting the Defect. The Defect Overview section is view only and contains the system locator which is active, the defect number, "#," assigned by the system and Name, the Date Submitted, Submitted By, Priority, Type, Status, Assigned To and Description. The History section is view only and shows all the actions taken in regards to a Defect by using "Edit" or "Update" buttons.

Referring now to FIG. 8, there shown is an example of a computer screen representation of a home screen display in accordance with one embodiment of the invention. Once a user is logged onto the system, the first screen to appear is "Home". This screen displays the Products, Assignments, Requirements, Testcases and Defects that pertain to the logged-on user. It also contains the Issues related to that Product(s). Thus, each user's Home display is unique to the user's assigned products and projects and the user's Home display will change as their work flow changes.

The first section 250 of the Home Display shows the name and description of all the Products the user has been assigned. The Product completion status is easily identified by looking at the status light indicators 222 to the right of each Product Description. Each color of the status light indicator is associated with the completion status: White=Not Started, Green=On Track, Yellow=At Risk, Red=In Trouble and Blue=Complete. The indicators are calculated based on the completed percentage of all the items associated with that Product.

The user section of the Home display contains an overview of the user's individual assignments, requirements, testcases, issues and defects and as such are all prefaced with the word "My". Navigation through the My Assignments 224, My Requirements 226, My Defects 228 and My Issues 230 sections is accomplished using common buttons, tool bars and similar operations. The buttons located in the middle of each section's tool bar are used to call-up an enterable display were the user can add, change, assign, attach, export, link, delete or provide a result for that specific assignment, requirement, issue, testcase or defect.

The box to the left of the item's Name is used to select an individual item. Selecting on the item's Name will cause a check mark to be placed in the box to clearly indicate the selected item or items. Only one item in each section can beg selected at a time when using the "Edit" button. More than one item may be selected at a time when using the "Update", "Reassign", "Attach", "Link", "Delete" or "Export" buttons. Note not all buttons may be available since they depend on the user's granted access.

The icon buttons in the far right of each section's toolbar are used to print and customize how this section is displayed. A printer icon 240 is used to print that specific section. The (±) icon 242 is used to maximize or minimize the items listed. A (−) indicates the entire list for that section is currently being displayed. Selecting on the (−) icon will change to a (+) icon indicating that the only that sections header information is currently displayed. A double up (or down) arrow 246 on the far right toolbar is used to customize the how the list is displayed on the screen. A double up arrow indicates that the list is displayed in its entirety. Selecting on the double up arrow will change it to a double down arrow which causes the long list to be grouped into pages. The page numbers will be displayed to the left of the section instead of the entire list. The user selects on the appropriate page number to view that page's contents.

An up (or down) arrow 248 to the right of each title (Name, Title, Start Date or Date Edited, Finish Date or Priority, % complete or Status) determines how each section list is sorted. An underlined arrow indicates the column which is currently being used to sort the entire list A down arrow indicates that they are sorted in ascending order (A-Z or 1-10), while an up arrow causes them to be sorted in a descending order (Z-A or 10-1). The user first selects which column will be used for the sort (shown by an underlined arrow) and then selects on that underlined arrow to determine the sort order ascending or descending.)

The My Assignments section 224 contains all the items assigned to the user and is where the user can add, change, update and reassign parameters or attach files. The My Assignments section contains Assignment Name, Project Name, Assignment Start and Finish Dates and % Complete status. The Start and Finish Dates are set using the "New" and "Edit" buttons. The % Complete number is entered by the user using the "Update" button in increments of 0, 20, 40, 60, 80 and Complete.

The buttons "New", "Edit", "Update", "Reassign", and "Attach" are part of the toolbar located in the middle of the My Assignments section header. "New" adds a new Assignment to this section. "Edit" will change the parameters of an Assignment already in the list. "Update" enables the completion status of the Assignment to be updated. "Reassign" will enable the user to assign the Assignment to a different user. "Attach" allows the user to attach a file to the Assignment.

The My Requirements section 226 contains all the product design requirements associated with the Products and Projects that are the responsibility of the user. The user can add, edit or assign design requirement as well as update the completion status or attach a file/document. The individual items displayed in this section are Requirement Name, Project Name, Start and Finish Dates, % Complete Status and status light indicator.

The % Complete Status column contains a % number and status light indicator for each Requirement. The % Completion is calculated by the system taking into account the status of all the items related to that Requirement. The color of the Status Light indicates the current completion status with White=Not Started, Green=On Track, Yellow=At Risk, Red=In Trouble or Blue=Complete. The actual percent completion number is displayed just to the left of the status light indicator. The Start and Finish dates of the Requirements are color coded based on completion status. If the status light indicator is red, the Start and/or Finish date (to the right of the Indicator Light) that is in trouble will also be displayed in red. An orange Start or Finish date indicates that the date is in trouble due to something it is dependent upon.

The buttons "New", "Edit", "Update", "Reassign", and "Attach" are part of the toolbar located in the middle of the My Requirements section header. "New" adds a new Requirement to this section. "Edit" will change the parameters of a Requirement already in the list. "Update" lets the user update the status of the Requirement by selecting either Not Started, Design, Begin Implementation, In Process, Code Complete, Debugging, Automation and Completed from the Status field options. "Reassign" enables the user to assign the Requirement to another user. The "Attach" button enables the user to attach a file to this Requirement. Note not all buttons may be available since they depend on the User's access that has been granted.

The My Defect section 228 contains defects related to the Product and Projects that are the responsibility of the user and is where the user can add, change or update Defect parameters. The My Defects section contains Defect number, "#," (a unique number that is automatically assigned by the system for ease of defect tracking), Defect Name, Project Name, Date Edited, Priority and Status. The Date Edited field is automatically entered by the system whenever a Defect is edited. The Priority of a defect to the project is selected by the user when using the "New" or "Edit" buttons from the following options—Critical, Serious, Major, or Minor. The Status of the defect is set by using the "Edit" or "Update" buttons and selecting either New, In Progress, Work Completed, Feedback, Verified, Deferred, Rejected, Suspended or Closed from the Status drop down menu.

The buttons "New", "Edit", "Update", "Reassign", "Export" and "Delete" are part of the toolbar located in the middle of the My Defects section header. "New" adds a new Defect to this section. "Edit" will change the parameters of a Defect already in the list. "Update" enables the status of the Defect to be changed. "Reassign" will enable the user to assign the Defect to a different user (if have proper authority). "Export" allows the user to export the selected Defect to another system. The "Delete" button will delete the Defects selected. Note not all buttons may be available since they depend on the User's access that has been granted.

The Issues section 230 contains all the issues related to the user's areas of responsibility and not just the user's individual issues. The Issues section 230 on the Home Display is enabled for viewing only and no changes or additions can be made on the issues display. The section columns displayed are Issue number, "#," (e.g. a unique number that is automatically assigned by the system), Issue Name, Project Name Issue belongs to, Date Submitted, Type, Priority and Status. The Date Submitted field is automatically entered by the system whenever an Issue is entered. The Type of Issue is selected by the user from the following options—Software, Documentation, Management, Miscellaneous. The Priority is selected by the user from the following options—Critical, Serious, Major, or Minor. The Status of the Issue is set by using the "Edit" or "Update" buttons and selecting either New, In Progress, Work Completed, Feedback, Verified, Deferred, Rejected, Suspended or Closed from the Status drop down menu. Issues can be added, changed and updated from the Project displays.

An Issue is generally used as a communication tool to define and alert users to situations that may have a large negative impact on the Project scope or schedule. Issues always pertain to the overall Project and as such can only be added, changed or deleted from a Project display. Issues may not be solvable but can be addressed and need to be noted and tracked. Issues have an added security feature called "Scope" (not shown) that can be used to limit the users who can view this issue. Selecting an Executive option in the Scope field will limit the issue to be viewed by only those users defined by the system administrator.

Selecting a "New" button 251 from the My Assignments, My Requirement, Testcases or My Defects toolbars will eventually bring up the appropriate enterable New Display where a New Assignment, Requirement, Testcase or Defect can be added. The first display brought up after selecting the "New" button is a Product folder hierarchy where the user selects the appropriate Product Folder to add this new item. Selecting a Product will call up a Project folder hierarchy where the user selects the desired Project Name. A user may continue to select the appropriate items from the folder hierarchy until an enterable New Display is called up where the user sets the New item's parameters. The New item is added to the system only after the "Submit" button at the bottom of the screen is selected. Selecting the "Cancel" button, will cause this item not to be added to the system and will bring you back to the previous display. The enterable fields on the New enterable displays called up are dependent on the type of Item being added (e.g., Assignment, Requirement, Testcases or Defect). In typical operation use of the "New" button is restricted to selected users.

Figure 9:
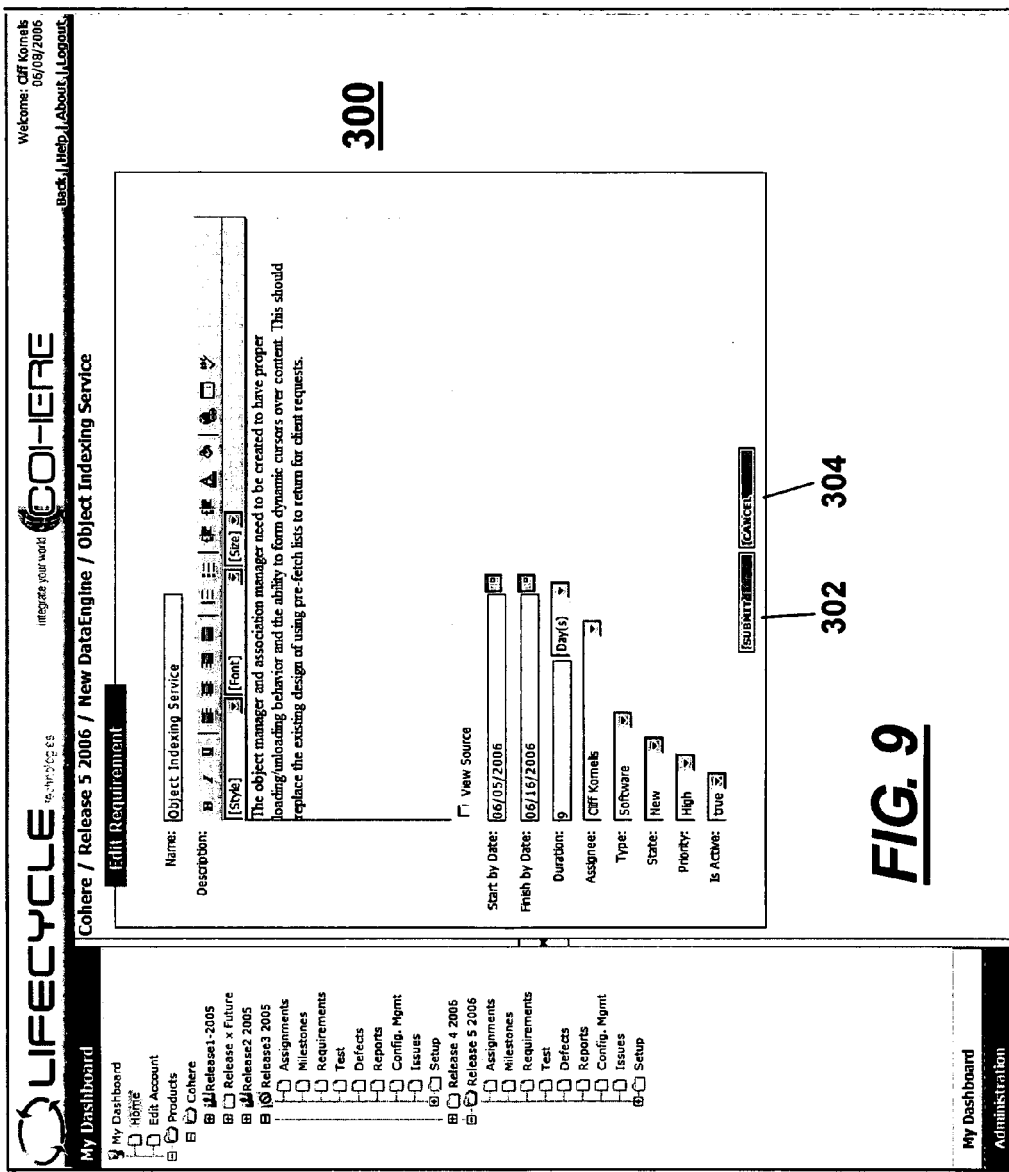
FIG. 9 shows an example of a computer screen representation of an enterable display as employed in the present invention is shown

Referring now to FIG. 9 an example of a computer screen representation of an enterable display as employed in the present invention is shown. The enterable display 300 is an example of an enterable display that presents to the user upon selecting an "Edit" button 252 from a higher level display. For example, selecting an individual item from the My Assignments, My Requirement, My Testcases or My Defects section and using the "Edit" button 252 will bring up an appropriate enterable Edit display where changes can be made to the selected Assignment, Requirement, Testcase or Defect. Parameter changes are made to the system only when a "Submit" button 302 at the bottom of the screen is selected. Activation of a "Cancel" button 304 will not incorporate any of the changes into the system and will bring you back to the previous display. In typical operation use of the "Edit" button is restricted to selected users.

The enterable fields appearing on the Edit display are dependent upon the type of Item being edited. Appropriate enterable fields correspond to whether the item being edited is, for example, a Task, Assignment, Testcases or Problem. Assignment fields include Name, Description, Duration, Start by Date, Finish by Date and Assignee. Requirement fields include Name, Description, Start by Date, Finish by Date, Duration, Assignee, Type, Priority, and Is Active fields. Testcase Fields include Name, Description, Priority, Category, Assignee, Is Automated and Is Active. Defects fields include Name, Description, Type, Priority, and Assignee Referring again to FIG. 9, selecting an individual item from My Assignments, My Requirements, My Testcases or My Defects and then using the "Update" button 254 enables the user to change the completion status. The user selects the status from the pull down arrow/menu to the right of the status field. Using the "Update" button for the Task and Assignment section brings up an enterable Update display where the user enters the Status from the selectable fields—Not Started, In Progress (20), In Progress (40), In Progress (60), In Progress (80) and Complete. The numbers stand for % complete i.e. 20 means item is 20% complete. Using the "Update" button from the Defect or Testcase section will call-up an enterable Update display where the user enters the Status from the selectable fields—New, In Progress, Work Complete, Feedback, Verified, Deferred, Reject, and Suspended. The user may also change the person assigned to this item by using the pull down arrow/menu. A comment is entered in the Comment field explaining this status change. Changes are made to the System only when the "Submit" button at the bottom of the screen is selected. The "Cancel" button will not incorporate any of the changes into the system and will bring you back to the previous display. In typical operation use of the "Update" button is restricted to selected users.

Selecting an item or several items from the My Assignments or My Requirements, My Testcases or My Defects section and then selecting the "Reassign" button enables the user to assign or reassign an Assignment, Requirement, Testcase or Defect to a single user. More than one item can be reassigned to that same user at the same time. The fields on the enterable Reassign Display are the same no matter if the user is assigning an Assignment, Requirement, Testcase or Defect. The appropriate user is assigned by selecting the pull-down arrow/menu to the right of the Assignee field. Only a list of the users that are appropriate to be assigned to this item will be displayed. If more than one item is selected at a time, the user list will only display those users who have access to all of the selected items. Thus, if a user only has access to one of the items in the list that has been selected the user's name will not appear for the combined list. Once a user has been assigned, a comment is entered explaining the assignment (or reassignment). The information is entered into the System once the "Submit" button at the bottom of the screen is selected. The "Cancel" button will not incorporate any of the changes into the system and will bring you back to the previous display. In typical operation use of the "Reassign" button is restricted to selected users.

Referring again to FIG. 8 while referring also to FIG. 9, selecting an item or several items from the My Assignments or My Requirements and then selecting the "Attach" button 258 enables the user to attach files and/or documents that are pertinent to this Item. Please note more than one item from that section can be attached to the same file/document at the same time. Files are attached by either entering the document web address into the File field or using the "Browse" button to the right of the File field to select the appropriate address through your computer's navigator. The user enters an explanation in the description field and selects the "Submit" button at the bottom of the screen to complete the attachment. The "Cancel" button will not incorporate any of these changes into the system and will bring you back to the previous display. In typical operation use of the "Attach" button is restricted to selected users.

Selecting an item or several items from the My Defects section and selecting on the "Export" button 260 will enable one or more defects to be exported to another Project's defect list. The User selects the desired Project to export the defect(s) to, on the enterable Export Defect Display. The user enters an explanation in the comment field and selects the "Submit" button at the bottom of the screen to complete the attachment. The "Cancel" button will not incorporate any of these changes into the system and will bring you back to the previous display. In typical operation use of the "Export" button is restricted to selected users.

Referring now to FIG. 10 an example of a computer screen representation of a requirements display as employed in the present invention is shown. An overview of an individual Requirement is displayed by selecting an Individual Requirement from the Requirements Display. The Individual Requirement Display 500 can be divided into sections including Requirement Functions 501, Requirement Overview 502, Requirement History 503, Associated Testcases 504, Attached Files 505, Requirement Dependencies 506 and Sub-Requirements 507.

The buttons on the top left of the display next to the Requirement tab calls up enterable displays for changing the properties or performing functions on the Requirement. A "Move" button 510 and a "Constraints" button 512 are specific to the Requirements Display. The "Constraints" button 512 is used to set time conditions on when Requirements will occur. The "Move" button 510 enables the user to move this Requirement to another area. The "New" button is not available on this tool bar as New Requirements may be added to the Requirements Display (one level up in the display hierarchy).

The Requirement Overview section 502 displays information related to the selected Requirement. The first item in this section, the System Locator 508, indicates the relationship of the selected Requirement to the overall Product. The first Name is the Product Name ("COHERE") followed by the Project Name ("RELEASE3 2005") followed by the Requirements Document Name. The Names in the System Locator are active meaning selecting them will bring the user to that particular display.

The area underneath the System Locator 508, provides an overall view of the Requirement's properties. The information provided may include 1. User currently assigned to this Requirement, 2. Current percent completion status, 3. Start and Finish by Dates, 4. Expected Duration, 5. Priority, 6. Type, 7. Status 8. who this Requirement was Submitted By, and 9. Requirement Description. This section of the display is view only and can only be changed by selecting the buttons at the top of the Requirement Display tool bar.

The History area 503 comprises a view only display that provides a listing of all the Status changes that have been performed on this Requirement. A Status change is defined as any change made using the "Update", "Reassign" and Edit Buttons. Thus, other changes made to this Requirement using the "New", "Attach", "Export", "Constraint", "Move" or "Add" buttons are not considered "Status" changes and will not be displayed in this section. The information shown with each "Status" change is 1. The date the change was made (Edited On), 2. Who made the change (Edited By), 3. Status, and 4. Comment associated with the type of change made.

The dependencies section 506 not only displays the Requirement dependencies, but is preferably the only place in the system where dependencies can be added since dependencies are a Requirement level function. Thus, Requirements can be set-up to be dependent only on other Requirements. Dependencies may be set up to correspond to Requirements within a selected Product as well as Requirements that are a part of another Product if appropriate. New dependencies are set-up by selecting the "Add" button to call up the Enterable Dependency Display. Existing dependencies are removed by using the "Remove" button to call up the Enterable Remove Association display.

The dependencies section 506 may contain separate lists including a Dependencies list and a Dependents list. Dependencies are defined as what this specific Requirement is dependent on occurring. Dependents are defined as other Requirements that are dependent on this specific Requirement's status and is a view only display.

Dependencies can be added to a Requirement. The type of dependency typically set-up is accomplished by using a pull down arrow/menu to the right of the Dependency Type field. The selectable options include 1. Start when Finished 2. Start when Started and 3. Finish on Finish. This will determine when that particular item needs to be started or finished as related to another Requirement.

Start when Finished—The Requirement's start date will be set by when the Requirement it is dependent on has been finished.

Start when Started—The Requirement's start date will be set by when the Requirement it is dependent on has started.

Finish when Finished—The Requirement's Finish date will be set by when the Requirement it is dependent on has been finished.

A Lag Duration may be added to a dependency. The Lag Duration is the delay time between items that have a dependency relationship. For example if the user needs a 1 month delay between when an Requirement finishes and the dependent Requirement starts, the user first selects a dependency type of Start when Finished and then enters a Lag Duration of 1 Month. Lag Duration default is measured in Days with other options of Hours, Weeks, Months and Years selectable from the pull down menu to the right of the Duration field.

Dependencies are set up by selecting an "Add" button from the Dependency section 506 on the Requirement display 500. Selecting the "Add" button will call up the Enterable Dependencies display which lists all the available Products. In one example, dependencies can only be set at the Requirement displays. Thus, the user will need to expand the Product list until the Requirement itself is revealed. This is accomplished by selecting on a + icon to the left of the Product Name until the Requirement is shown. Dependencies are set by selecting the Requirement that a selected requirement is dependent on occurring. Dependencies may be assigned to Sub-Requirements by first maximizing the list by selecting on the (+) icon to the left of the Requirement Name.

Figure 11:
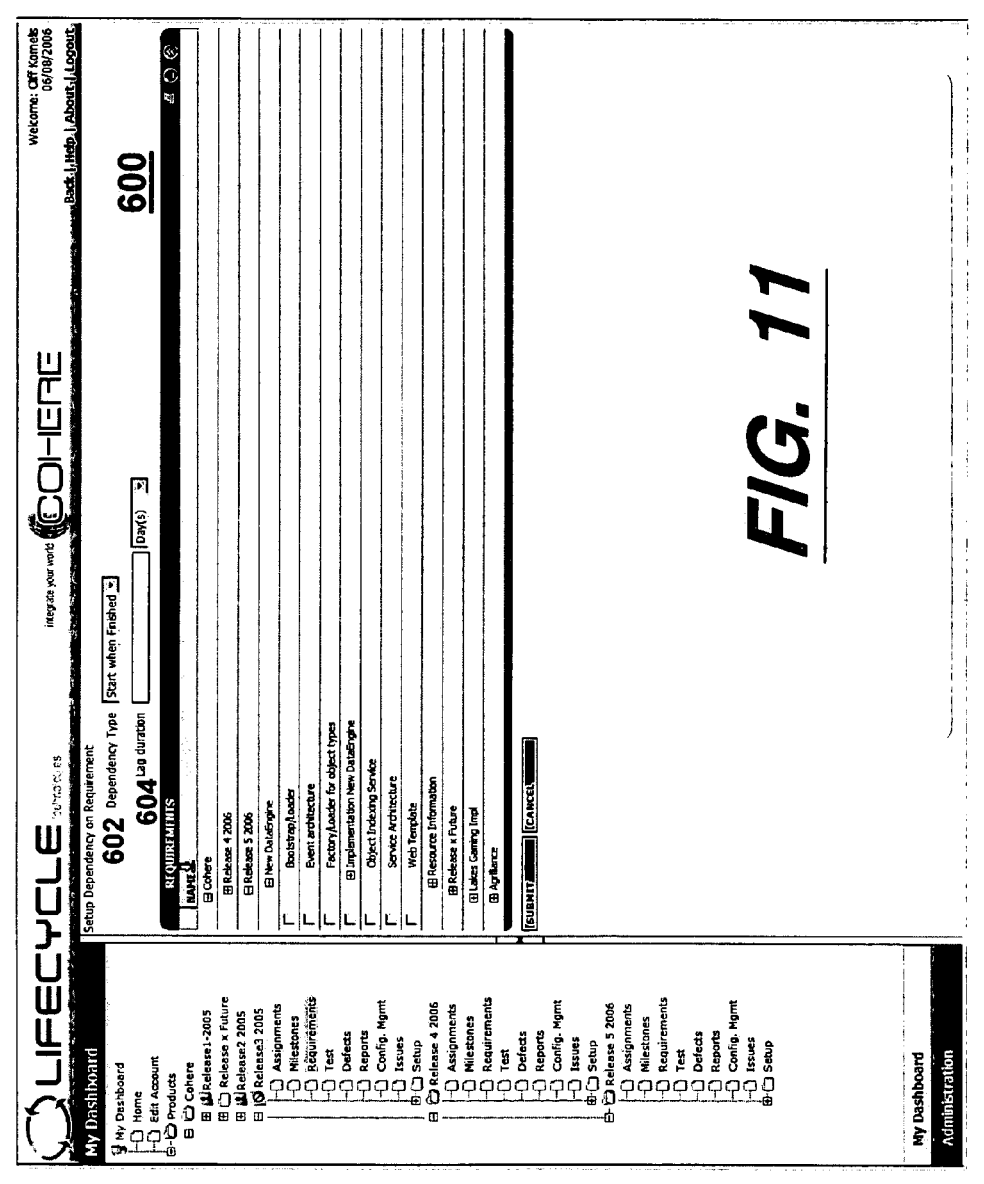

Referring now to FIG. 11, there shown is an example of a computer screen representation of an enterable dependency display 600. A Dependency Type is selected from the pull down menu to the right of the Dependent Type field 602 from the options of Start when Started, Start when Finished and Finish on Finish. The Lag Duration 604, if any, is set by entering a number in the field and selecting the unit of measure, for example, hours, days, weeks, months, and years.

Removing dependency associations is done from the Dependency section at the Requirement level. The "Remove" button will become activated once a dependency has been selected. More than one dependency may be removed at once by selecting each individual dependency and then selecting the "Remove" button to call up the Remove Association Enterable display. The item must still be selected (check in the box next to the name) when the "Submit" button is activated.

Referring again to FIG. 10, sub-requirements, if any, are shown the Requirements display in a separate sub-requirements section 507. The sub-requirements section 507 is set up like the Requirements Display using the same common toolbar (New, Edit, Update, Reassign, Attach and Delete) and similar operations to add new Requirements and change existing Requirement parameters. Using the "New" button without selecting a Sub-Requirement will add a new Sub-Requirement to the same level as the Sub-Requirements shown. Selecting a sub-requirement and then using the "New" button will add a requirement under the sub-requirement. The Requirement Name used in the System Locator at the top of a sub-requirement display will consistently contain the Name of the current Requirement being viewed. Sub-requirements can be sorted by a specific column using the up/down underlined arrow. The display also provides a clear indication of the sub-requirements status (and any Requirements underneath it). Sub-requirements may also be viewed from the Requirements Display by using the maximize/minimize (±) button to the left of the Requirement Name. Selecting on the + will cause any sub-requirements related to the selected Requirement to be displayed underneath it. Sub-requirements will continue to be brought up until a "−" on the maximize/minimize display is shown.

A "Move" button 510 may be located on the top toolbar of the Requirement display. The "Move" button brings up a Requirements display that lists the hierarchy of Products, Projects and Requirements. A Requirement preferably can only be moved to another Requirement (and not at the Project or Product level). A Requirement may be moved to more than one Requirement at a time.

A "Constraint" button 512 may be located on the top toolbar of the Requirement display. The "Constraint" button brings up a Setup Constraints on Requirements display where the user enters the Completion Before and/or the Start Before End dates. Units of time are selected from Hours, Days, Weeks, Months, Years with Days being the default.

A "Link to Testcase" button may be located on the top toolbar of the Requirement display. The "Link to Testcase" button brings up the Testcase display where the user selects the Testcase or Testcases that this Requirement will be linked to. Linking a Requirement to a Testcase can be beneficial in tracking the status and or results.

A "Link to Requirement" button may be located on the top toolbar of the Testcases or Testcase display. The "Link to Requirement" button brings up the Requirements display where the user selects the Requirement or Requirements that this Testcase will be linked to. Linking a Testcase to a Requirement can be beneficial in tracking the status and or results.

A "Link to Defect" button may be located on the top toolbar of the Testcases or Testcase display. The "Link to Defect" button brings up the Defects display where the user selects the Defect or Defects that this Testcase will be linked to. Linking a Testcase to a Defect can be beneficial in tracking the status and or results.

Using the "Add" button calls up the Enterable display where dependencies between Requirements are set-up. In one example, the "Add" function is only available at the Requirement level in the Dependencies section.

Using the "Remove" button calls up the Remove Association Enterable display. This display is used to remove the association between a Requirement and a Testcase or to remove the dependency association between Requirements. In one example, the Remove function is only available in the Remove Association section on the Requirement and Testcase displays or in the Dependencies section of the Requirement display.

The invention has been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by specifically different equipment, and devices and algorithms, and that various modifications, both as to the equipment details and operating procedures, may be accomplished without departing from the true spirit and scope of the present invention.

What is claimed is:

1. A coherent interactive project management system comprising:
   a dashboard including a graphic user interface ("GUI") in communication with a GUI engine, where the dashboard provides links to a plurality of differing interactive hierarchical display screens;
   a data engine connected to transmit information to and receive information from the dashboard, wherein each of a plurality of users have access to a user-specific version of the dashboard, where the user-specific version controls displays of and access to information applying to a specific user, and the specific user employs the user-specific version of the dashboard for requesting, modifying and sharing information through the data engine;
   where the GUI engine includes means for dynamically generating enterable forms used for interactively adding or modifying data available through the data engine, where the dynamically generated enterable forms are customized for each of the plurality of users; and
   a health module for determining project health, wherein the health module comprises pre-programmed logic for calculating health values for a type by
   computing a base health value from attributes and data,
   optionally processing situational attributes, and
   generating a health status value.

2. The system of claim 1 where each of the plurality of users may modify a user-specific version of the dashboard of at least one other user by submitting data through a dynamically generated form.

3. The system of claim 1 wherein the GUI includes a web client in communication with a process router, where the process router is connected to transmit and receive information from a business logic program.

4. The system of claim 2 wherein the business logic program includes a plurality of software program modules including a health module, a scheduler, and a rendering module.

5. The system of claim 1 wherein the plurality of users are assigned different security levels to the information such that not all users will have access to the same information.

6. The system of claim 1 wherein the GUI engine includes an editing software module, a task software module, and a software module for discovering attributes.

7. The system of claim 1 wherein the means for dynamically generating enterable forms comprises a rendering engine operating to receive attributes from a software module for discovering attributes, the rendering engine being coupled to at least one GUI template function for receiving and responding to user requests.

8. The system of claim 7 wherein the rendering engine comprises:
a module for retrieving an attribute list of a selected type requested for entry or modification by a user by activating the discover attributes software module to query a configuration file containing base definitions of the selected type and the attributes associated with the selected type;
a module for checking security rights associated with the requesting user;
a module for applying special rules before generating a form; and
a module for generating the requested form based on the attribute list, user security rights and application of special rules.

9. The system of claim 8 where any information or tasks exceeding the user's security level of access are suppressed on a generated form.

10. The system of claim 8 wherein the rendering engine operates to build an enterable form including editing screens for notes.

11. The system of claim 1 wherein the data engine is connected to receive information from multiple data sources.

12. The system of claim 11 wherein the data engine tracks information including associations between data based on pre-determined rules.

13. The system of claim 1 wherein the GUI engine includes business logic for coordinating dependencies of at least one task association with other tasks.

14. The system of claim 1 wherein the dashboard includes a plurality of displays having a set display indicators showing the status of a displayed item.

15. The system of claim 14 wherein the set of display indicators include color-coded status light indicators.

16. The system of claim 15 wherein the dashboard comprises a home level including a products list display linked to a product display, and wherein the home level displays a GUI interface.

17. The system of claim 16 wherein the dashboard links to at least one product display linked to a project display including at least one set of project areas.

18. The system of claim 17 where each project area is associated with a requirements display, a test display and a defects display.

19. The system of claim 18 wherein the requirements display links to a set of lower level displays including a requirement documents display and a list of requirements having one or more individual requirements.

20. The system of claim 18 wherein the test display links to another set of lower level displays including a testplans display and a set of testcases.

21. The system of claim 18 wherein the defects display links to another set of lower level displays including a defects display having a defects list and a history display.

22. The system of claim 1 wherein the health values are presented on a display screen as a status light where a particular color represents a health indication of the type.

23. The system of claim 1 wherein health status value indicates the health of the evaluated type as compared to scheduled milestones.

24. The system of claim 1 wherein a health value for a type is represented as a displayed status light color.

25. A coherent interactive project management process comprising the steps of:
generating a dashboard including a graphic user interface ("GUI") in communication with a GUI engine, where the dashboard provides links to a plurality of differing interactive hierarchical display screens;
transmitting information to and receiving information from the dashboard, wherein each of a plurality of users have access to a user-specific version of the dashboard, where the user-specific version controls displays of and access to information to information applying to a specific user, and the specific user employs the user-specific version of the dashboard for requesting, modifying and sharing information through the data engine;
determining project health using pre-programmed logic for calculating health values for a type by
computing a base health value from attributes and data, optionally processing situational attributes, and generating a health status value; and
dynamically generating enterable forms used for interactively adding or modifying data available through the data engine, where the dynamically generated enterable forms are customized for each of the plurality of users.

26. The process of claim 25 wherein the step of dynamically generating enterable forms further comprises the steps of:
retrieving an attribute list of a selected type requested for entry or modification by a user;
checking security rights associated with the requesting user;
optionally applying special rules before generating a form; and
generating the requested form based on the attribute list, user security rights and application of special rules.

27. The process of claim 25 wherein the step of dynamically generating enterable forms further comprises the steps of:
retrieving an attribute list of a selected type requested for entry or modification by a user;
checking security rights associated with the requesting user; and
generating the requested form based on the attribute list and application of special rules.

* * * * *